United States Patent
Kobayashi et al.

(10) Patent No.: US 7,433,317 B2
(45) Date of Patent: Oct. 7, 2008

(54) NETWORK CONNECTION APPARATUS AND NETWORK CONNECTION SWITCHING METHOD

(75) Inventors: Hirokazu Kobayashi, Kawasaki (JP);
Taisuke Matsumoto, Yokohama (JP);
Shinkichi Ikeda, Yokohama (JP);
Makoto Funabiki, Yokohama (JP);
Masayuki Kumazawa, Yokohama (JP);
Toyoki Kawahara, Chofu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 589 days.

(21) Appl. No.: 10/526,210

(22) PCT Filed: Feb. 16, 2004

(86) PCT No.: PCT/JP2004/001638

§ 371 (c)(1),
(2), (4) Date: Mar. 3, 2005

(87) PCT Pub. No.: WO2004/073271

PCT Pub. Date: Aug. 26, 2004

(65) Prior Publication Data
US 2005/0249113 A1    Nov. 10, 2005

(30) Foreign Application Priority Data
Feb. 14, 2003   (JP)   ............... 2003-036441
Feb. 12, 2004   (JP)   ............... 2004-034694

(51) Int. Cl.
*G01R 31/08*    (2006.01)
*H04L 12/43*    (2006.01)

(52) U.S. Cl. ........................ 370/241; 370/461
(58) Field of Classification Search ........ 370/219, 370/220, 461, 462, 450, 241, 225–228
See application file for complete search history.

(56) References Cited

U.S. PATENT DOCUMENTS 5,473,599 A    12/1995    Li et al.

(Continued)

FOREIGN PATENT DOCUMENTS

EP    1006702 A2 *    6/2000

(Continued)

OTHER PUBLICATIONS

R. Hinden, et al, "Virtual Router Redundancy Protocol <draft-ietf-vrrp-spec-v2-06.txt>", Internet-Draft, Feb. 28, 2002, 32 pages.

(Continued)

*Primary Examiner*—Kwang B. Yao
*Assistant Examiner*—Candal Elpenord
(74) *Attorney, Agent, or Firm*—RatnerPrestia

(57) ABSTRACT

Between network connection apparatuses connected to each other by use of a virtual redundant arrangement, a first network connection apparatus that is in a standby state receives an advertisement message from a second network connection apparatus that is active as a network connection apparatus, and uses a priority comparing section to compare its own priority with the priority in the received advertisement message. When its own priority is higher, the first network connection apparatus uses a master down timer comparing section to compare the remaining time of a master down timer with the time as weighted in accordance with its own priority and resets the timer for a shorter time.

26 Claims, 26 Drawing Sheets

U.S. PATENT DOCUMENTS

| | | | | |
|---|---|---|---|---|
| 5,835,696 A | * | 11/1998 | Hess | 714/10 |
| 6,148,411 A | * | 11/2000 | Ichinohe et al. | 714/4 |
| 6,856,591 B1 | * | 2/2005 | Ma et al. | 370/216 |
| 6,954,436 B1 | * | 10/2005 | Yip et al. | 370/254 |
| 7,092,354 B2 | * | 8/2006 | Jensen | 370/218 |
| 7,152,179 B1 | * | 12/2006 | Critchfield | 714/4 |
| 7,209,435 B1 | * | 4/2007 | Kuo et al. | 370/219 |
| 2002/0184387 A1 | * | 12/2002 | Yamaya et al. | 709/238 |

FOREIGN PATENT DOCUMENTS

| | | |
|---|---|---|
| JP | 7-264233 | 10/1995 |
| JP | 2000-324154 | 11/2000 |
| JP | 2001-168899 | 6/2001 |
| JP | 2003-46539 | 2/2003 |

OTHER PUBLICATIONS

S. Knight et al., "RFC 2338 Virtual Router Redundancy Protocol", 1998.

International Search Report corresponding to International Application No. PCT/JP2004/001638 dated May 25, 2004.

* cited by examiner

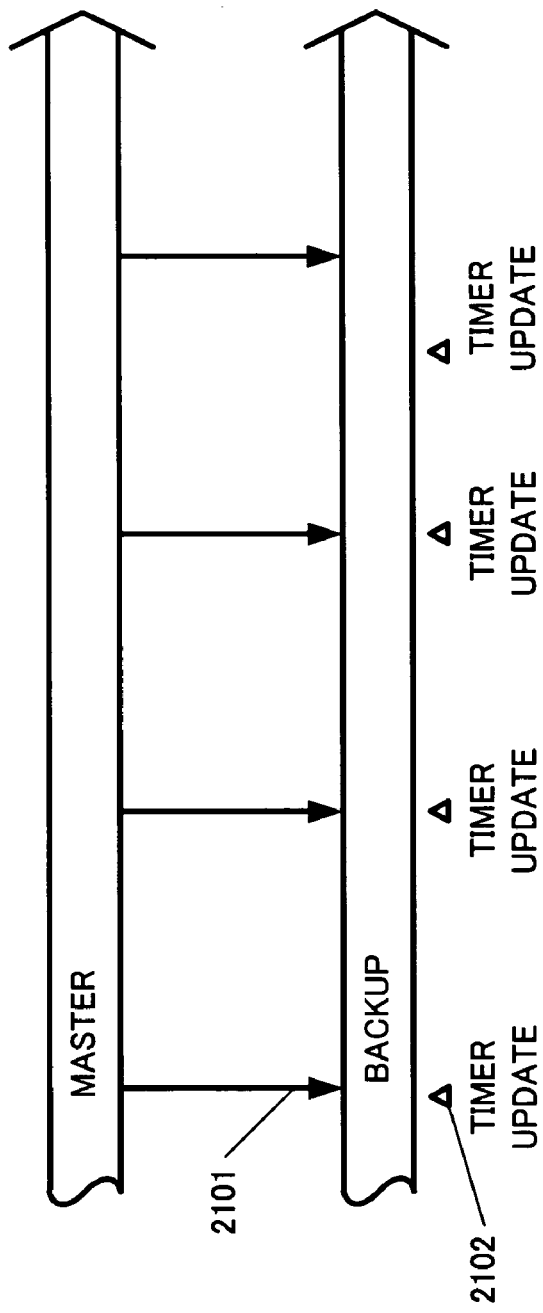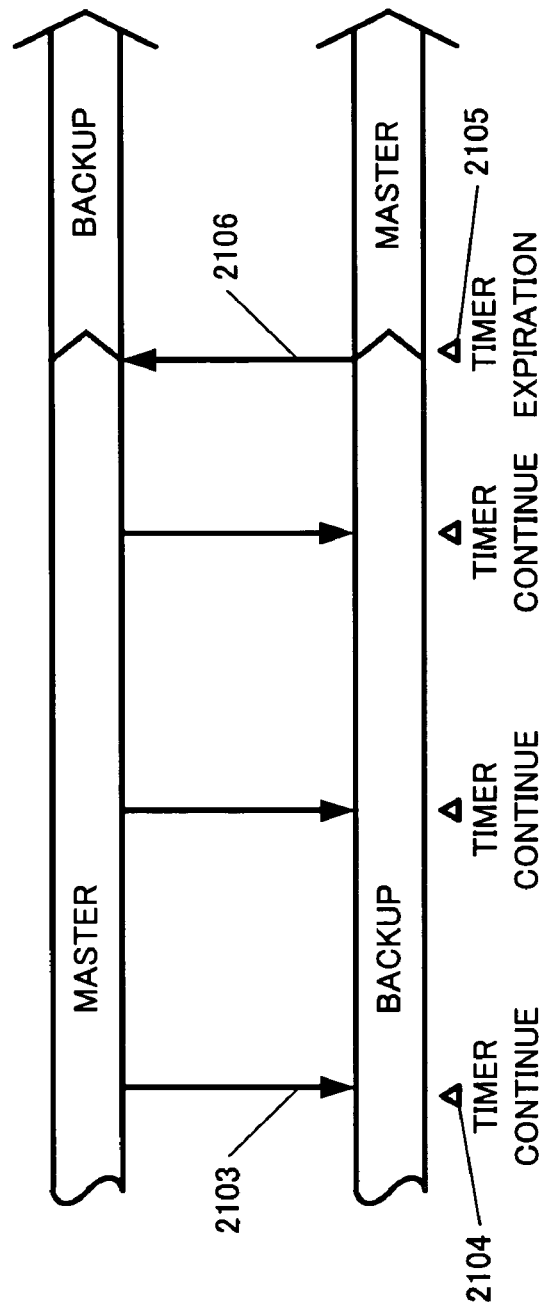
FIG.25A
FIG.25B

NETWORK CONNECTION APPARATUS AND NETWORK CONNECTION SWITCHING METHOD

This application is a U.S. National Phase Application of PCT International Application PCT/JP2004/001639.

TECHNICAL FIELD

The present invention relates to a network connection apparatus connected to others by a virtual redundant arrangement and network connection switching method, and more particularly to switching between an operating-state network connection apparatus and a standby-state network connection apparatus.

BACKGROUND ART

Conventionally, there is a system that a plurality of network connection apparatuses (hereinafter, referred to as "routers") for communication with another sub-network are arranged, in parallel, with an external network thus taking a redundant arrangement within an IP (Internet Protocol) network so that, when a trouble occurs in the router operating as a master (hereinafter, referred to as a "master router"), another router in standby state (hereinafter, referred to as a "backup router") is to act as an alternative apparatus for continuing the communication. As such a system, there is known a system using a Virtual Router Redundancy Protocol for IPv6 (see U.S. Pat. No. 5,473,599, and "Virtual Router Redundancy Protocol for IPv6", the Internet <URL: http://www.ietf.org/internet-drafts/draft-ietf-vrrp-ipv6-s pec-03.txt>, for example).

FIG. 24 is a diagram illustrating one arrangement example of the virtual router system. In FIG. 24, there are connected to the local area network 2405, a master router 2401 for actual network connection, a backup router 2402 for the case the master router 2401 is not to be used, and host nodes 1-3 (hereinafter, referred to as "node 1", "node 2" and "node 3"). Meanwhile, the master router 2401 and the backup router 2402 are connected respectively to exterior local area networks 2404 different from each other. In this prior art, a router group for executing VRRP is to be group-designated by means of a virtual router ID (hereinafter, referred to as "VRID"). Within the same sub-network, one is taken as a master router out of the router group having the same VRID, to actually deliver packets. As for the backup router, in the case a trouble occurs in the master router, the backup router itself switches into a master router to thereby deliver packets. The master router and the backup router are to indicate virtually the same address (virtual router IP address, virtual router MAC address) to the nodes. This allows the node to send a packet using a virtual router address as a default router, without the consciousness of whether the router for transmission is a master router or a backup router.

FIGS. 25(a) and 25(b) are sequence charts showing a switchover operation of between master and backup phases, with the use of a VRRP-defined advertisement message to be exchanged between the master and backup routers.

In particular, FIG. 25(a) is a chart showing an operation where the priority of the relevant apparatus is lower than the priority in a received advertisement message.

In FIG. 25(a), the master router 2401 sends, to the backup router, an advertisement message 2101 including a priority for itself to become a master router, by multicast at a regular interval. The backup router 2402, when receiving advertisement messages 2101 having a priority equal to or higher than its own priority from the master router within a constant time period (master down-time), resets 2102 a master down-timer and makes certain of the master 2401 being in operation.

FIG. 25(b) is a chart showing an operation where the priority possessed is higher than the priority in the received advertisement message.

In FIG. 25(b), the backup router, when receiving an advertisement message 2103 from the master router having a priority lower than the priority of its own, discards the advertisement message as it is without resetting the master down-timer (2104). The backup router, when the master down-timer expires (2105), decides that a trouble occurs in the master router and becomes itself into a master router, to send an advertisement message 2106 to the routers of the same group. Because the master down-timer has a time-out value set shorter for the higher priority and longer for the lower priority, a master router is to be established in accordance with the priority.

Incidentally, there is shown in FIG. 26 a format for an advertisement message. In FIG. 26, type field 2201 represents the type of message, wherein '1' shows an advertisement message. VRID field 2202 is to describe therein a virtual-router identifier VRID representative of a virtual router group to which the relevant apparatus belongs. Priority field 2203 represents a priority to assume a master router of among the virtual router group. Advertisement interval field 2204 represents a time interval to send advertisement messages. IPv6 address field 2205 describes therein a virtual router address of the virtual router group. In the VRRP message and other fields, prescribed information is to be described in compliance with the VRRP procedure.

Meanwhile, there is disclosed, as another prior art, a technique which exchanges mutual-monitor messages at a regular interval between the master router and the backup router to thereby detect a trouble early so that, in the case of a trouble occurrence, metric value is changed to send a route information message thereby increasing the speed of switchover processing (see JP-A-7-264233).

However, with the conventional configuration described in the "Virtual Router Redundancy Protocol for IPv6", even where the backup router receives from the master router an advertisement message whose priority is lower than its own one, it does not immediately transit to a master but discard the received advertisement message. A lapse of master downtime is waited to implement a switchover processing after a timeout. Thus, there is a problem that switchover is not effected swiftly between master and backup routers even in the presence of a router having a higher priority.

Besides switchover with a router higher in priority, router switchover process is first effected after the master router becomes unusable. For this reason, there is a problem that swift switchover is impossible between mater and backup routers in such a situation that there is a change in connectability with a network, e.g. in a mobile communication environment.

Meanwhile, the conventional configuration described in JP-A-7-264233 involves a problem that network load increases with the increase in the number of the routers taking a redundant arrangement because of the need to mutually send messages from the master router and backup router in order for state monitoring.

DISCLOSURE OF THE INVENTION

The present invention is to solve the foregoing conventional problem, and it is an object thereof to provide a network connection apparatus and network connection switching method that master and backup router can be switched over swiftly by a simple structure without increasing the network load even where there is an increase in the number of the routers taking a redundant arrangement.

In order to solve the foregoing problem, a network connection apparatus of the invention is a network connection apparatus for operating a plurality of network connection apparatuses connected to a local area network virtually as one network connection apparatus, the network connection apparatus comprising: a state monitor section for managing an operating state as a network connection apparatus; a message processing section for performing an exchange process of an advertisement message representative of the operating state during operation as a network connection apparatus; a priority comparing section for acquiring priority information representative of a priority to operate as a network connection apparatus from the advertisement message received, and comparing same with priority information possessed; and a transition timer section for counting for a timing of transition of from a standby state into an operating state as a network connection apparatus; whereby, when the state monitor section decides not in an operating state, the priority comparing section commences a process for arbitration between the network connection apparatuses in standby state to transit to an operating state by use of the master transition timer at a time deciding that the priority possessed is higher than the priority information in the advertisement message received.

With this configuration, the timing to start up the process for causing the network connection apparatus to transit to operating state is given at a time point that the priority possessed is decided higher. Thus, the time required for switchover can be shortened to enable swift switching from standby state into operating state.

A network connection apparatus of the invention is a network connection apparatus for operating a plurality of network connection apparatuses connected to a local area network virtually as one network connection apparatus, the network connection apparatus comprising: a state monitor section for managing an operating state as a network connection apparatus; a message processing section for performing an exchange process of an advertisement message representative of the operating state during operation as a network connection apparatus; an advertisement timer for counting for a timing to send the advertisement message at a regular interval; a message timer section for counting a time to determine whether the advertisement message is received in a predetermined time from the network connection apparatus operating as a network connection apparatus; and a priority comparing section for acquiring priority information representative of a priority to operate as a network connection apparatus from the advertisement message received, and comparing same with priority information possessed; and a master transition timer section for counting for a timing of transition of from a standby state into an operating state as a network connection apparatus; whereby, when the state monitor section decides not in an operating state, the priority comparing section in a case of decision the priority possessed is higher than the priority information in the received advertisement message compares between a remaining time of the message timer section and a skew time calculated based on the priority possessed, to set the skew time to the master transition timer when the skew time is shorter, so that, when the master transition timer section goes into a time-up, the state monitor section instructs the message processing section to send an advertisement message requesting for transition of from operating state into standby state to the network connection apparatus operating as a network connection apparatus.

With this configuration, the time of starting up a process for the network connection apparatus to transit to operating state can be given maximally a skew time required in arbitrating with another standby network connection apparatus. Thus, the time required in switching can be reduced to enable swift switching from standby state into operating state.

Meanwhile, a network connection apparatus of the invention further comprises a link monitor section for evaluating a connectability with an external network, wherein in a case the link monitor section decides the connectability as a predefined value or higher when the master transition timer section goes into a time-up, the state monitor section sends an advertisement message instructing for transition from operating state into standby state to the network connection apparatus operating as a network connection apparatus.

With this configuration, there is no need of exchanging a particular message for monitoring the connectability with the external at between the network connection apparatuses. Switchover process can be effected only when the standby network connection apparatus has an well connectability with an external network. Thus, the network connection apparatus, to become an operating state after switching, is allowed to assure a preferred connection with an external network.

Meanwhile, a network connection apparatus of the invention further comprises a link monitor section for evaluating a connectability with an external network, wherein in a case the state monitor section decides operating as a network connection apparatus and the link monitor section decides the connectability lower than a predefined value, the state monitor section instructs the message processing section to send an advertisement message representative of an operating state as a network connection apparatus to the network connection apparatus on a same local area network.

With this configuration, there is no need of exchanging a particular message for monitoring the connectability with the external at between the network connection apparatuses. When the connectability with an external network is worsened in the operating network connection apparatus, the standby network connection apparatus can know a connection state with the operating network connection apparatus. Thus, switching can be effected swiftly over to the standby network connection apparatus before the operating network connection apparatus loses the connection to an external network.

Meanwhile, a network connection apparatus of the invention further comprises a link monitor section for evaluating a connectability with an external network, wherein in a case the state monitor section decides operating as a network connection apparatus and the link monitor section decides the connectability lower than a predefined value, the state monitor section instructs the message processing section to send an advertisement message requesting for a transition from standby state into operating state to the network connection apparatus on a same local area network.

With this configuration, there is no need of exchanging a particular message for monitoring the connectability with the external at between the network connection apparatuses. When the connectability with an external network is worsened in the operating network connection apparatus, the standby network connection apparatus explicitly undergoes a switchover process. Thus, switching can be effected swiftly over to the standby network connection apparatus before the operating network connection apparatus loses the connection to an external network.

Meanwhile, the transition request from operating state into standby state by the state monitor section of the network connection apparatus of the invention, is the advertisement message set with a possessed priority at a highest, and the master transition timer section is set with a skew time based on the priority set.

With this configuration, the currently operating network connection apparatus is to receive an advertisement message higher in priority than the relevant apparatus. The startup time can be reduced for a transition process from operating state into standby state, to enable swift switching between the operating network connection apparatus and the standby network connection apparatus. Meanwhile, for the standby network connection apparatus, the time up to starting a switchover process can be set at the skew time, enabling swift transition.

Meanwhile, the advertisement message representative of the operating state, in a case the state monitor section decides operating as a network connection apparatus and the link monitor section decides the connectability lower than a predefined value, is set with a priority at a lowest.

With this configuration, the currently standby network connection apparatus can decide that the operating network connection apparatus is lower in priority than the relevant apparatus. Thus, the switching request can be sent maximally in a skew time from the standby network connection apparatus to the operating network connection apparatus, enabling to swiftly switch the network connection apparatus.

A network connection switching method of the invention comprises: a state monitoring step of deciding whether a plurality of network connection apparatuses connected to a local area network are in operating state or in standby state as a network connection apparatus to operate virtually as one network connection apparatus; a step of receiving an advertisement message from a second operating network connection apparatus in operating state as a network connection apparatus by a first network connection apparatus decided as standby state in the decision; and a priority comparing step of comparing between priority information, in the advertisement message, representative of a priority to operate as a network connection apparatus and priority information possessed; whereby an arbitration process is commenced at between the network connection apparatuses in standby state to transit to operating state at a time that the priority possessed is decided higher in the priority comparing step.

Due to this, the timing to start up the process for transiting the standby network connection apparatus into operating state is given in timing at a time the priority possessed is decided higher, thus enabling to reduce the time required in switching and to switch it swiftly from standby state into operating state.

A network connection switching method of the invention comprises: a state monitoring step of deciding whether a plurality of network connection apparatuses connected to a local area network are in operating state or in standby state as a network connection apparatus to operate virtually as one network connection apparatus; a step of receiving an advertisement message from a second operating network connection apparatus in operating state as a network connection apparatus by a first network connection apparatus decided as standby state in the decision; a step of counting a master down time for a decision as to whether the advertisement message is to be received in a predetermined time from the second network apparatus; a step of notifying of a transition to operating state from the first network apparatus to the second network apparatus when the master down time expires; a priority comparing step of comparing between priority information, in the advertisement message received, representative of a priority to operate as a network connection apparatus and priority information possessed; and a step of comparing between a remaining time of the master down time and a skew time calculated shorter in time as the priority possessed is higher when the priority possessed is higher in the priority comparing step, and replacing the master down time with the skew time when the skew time is shorter.

Due to this, the time to start up the process for transiting the standby network connection apparatus to operating state is given a skew time maximally, thus enabling to reduce the time required in switching and to switch it swiftly from standby state into operating state.

Meanwhile, a network connection switching method of the invention further comprises a step of detecting whether a connectability with an external network is equal to or greater than a predefined value or not, and a step of permitting the notification, of a transition to operating state, from the first network apparatus to the second network apparatus only when the connectability is equal to or greater than the predefined value in the detection at the first network connection apparatus.

Due to this, switching operation can be made only when the standby network connection apparatus has a well connectability with an external network without exchanging a particular message for monitoring the connectability with the external at between the network connection apparatuses. Consequently, favorable connectability can be assured for the network connection apparatus that is to become an operating state after switching.

Meanwhile, a network connection switching method of the invention further comprises a transition request step for the second network connection apparatus to request the first network connection apparatus to transit to operating state when the connectability of the second network connection apparatus is not equal to or greater than the predefined value.

Due to this, the standby network connection apparatus can explicitly undergo a switching operation when connectability with an external network is worsened in the operating network connection apparatus, without exchanging a particular message for monitoring the connectability with the external at between the network connection apparatuses. Consequently, the operating network can be swiftly switched into a standby network connection apparatus before losing the connectability with an external network.

Meanwhile, a network connection switching method of the invention further comprises a step of temporarily setting the priority possessed at a highest when the priority possessed is higher in the priority comparing step at the first network connection apparatus, to notify the priority information possessed from the first network connection apparatus to the second network connection apparatus and other standby network connection apparatus in the step of a notification of transition to operating state.

Due to this, the currently operating network connection apparatus is to receive an advertisement message higher in priority than the relevant apparatus, enabling to reduce the startup time for the transition process from operating state into standby. Switching can be effected swiftly between the operating network connection apparatus and the standby network connection apparatus.

Meanwhile, in a network connection switching method, the second network connection apparatus in the transition request step makes a notification of the priority possessed provided a lowest.

Due to this, because the currently standby network connection apparatus is allowed to decide the operating network connection apparatus lower in priority than the relevant apparatus, a switching request from the standby network connection apparatus to the operating network connection apparatus can be sent in a skew time maximally, thus enabling to swiftly switch the network connection apparatus.

Meanwhile, in a network connection switching method of the invention, the priority possessed is returned to a value immediately preceding to a setting at a highest after a transition of the first network connection apparatus from standby state into operating state.

Due to this, the network connection apparatus entered from standby state into operating state is returned to the former priority. Consequently, when there is an advent of another network connection apparatus having a higher priority, switching is possible to the same network connection apparatus.

Meanwhile, a network connection switching method of the invention further comprises a step of replacing the master down time with the skew time at a time that the first network connection apparatus receives the transition request from the second network connection apparatus.

Due to this, the standby network connection apparatus, when requested to start up a switchover process from the operating network connection apparatus, is to establish a time of up to a switchover such that arbitration is available with another standby network connection apparatus. Consequently, transition is possible to the network connection apparatus having the highest priority.

As in the above, according to the present invention, according to the network connection apparatus and network connection switching method of the invention, there can be obtained a significant effect that switchover can be swiftly effected without increasing network load where there is a standby network connection apparatus higher in priority than the currently applied network connection apparatus due to such causes as a failure in the operating network connection apparatus, a new connection of a network connection apparatus or a worsened connectability of a network connection apparatus operating as an operating network connection apparatus with an external network.

BRIEF DESCRIPTION OF THE DRAWINGS

FIGS. 25(a) and 25(b) are a figure showing a sequence of a network connection switching method in the prior art.

BEST MODE FOR PERFORMING THE INVENTION

Figure 1:
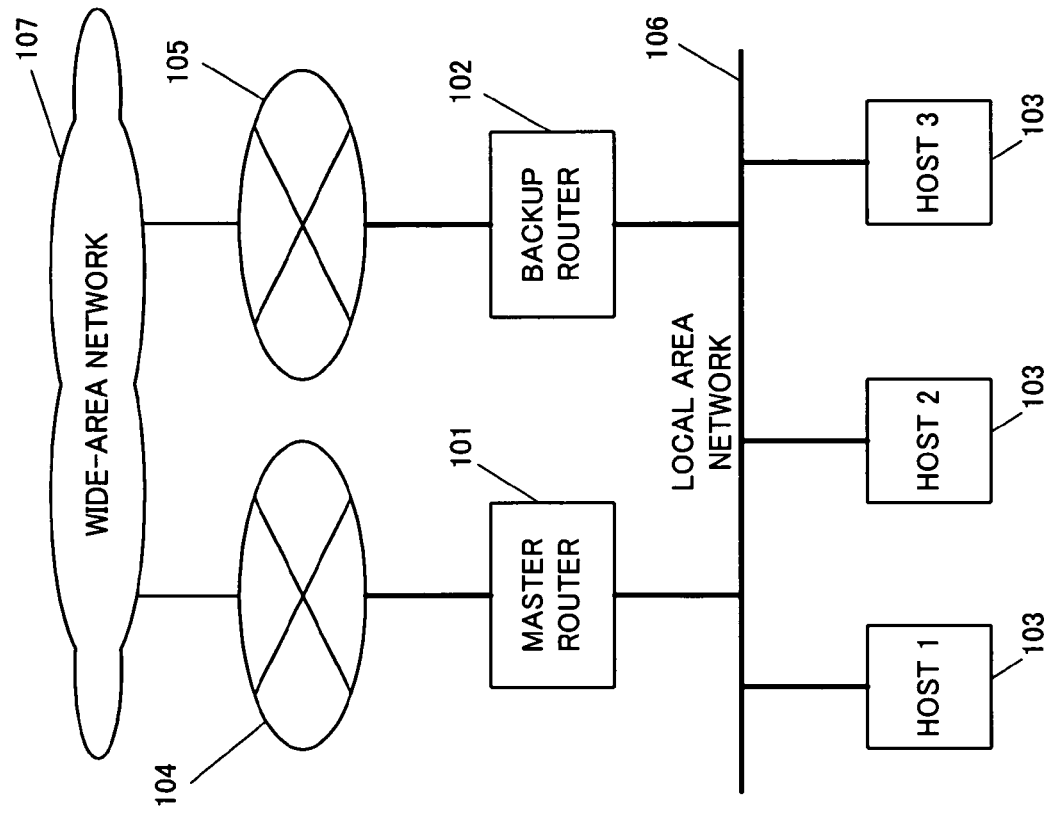
FIG. 1 is a configuration diagram of a network system according to embodiment 1 of the present invention.

Now, embodiments of the present invention will be explained while referring to the drawings.

Embodiment 1

FIGS. 1 to 6 illustrate a network connection apparatus and network system in one embodiment according to the present invention. In the ensuing explanation, the network connection apparatus in operation as a router is referred to as a master router while the network connection apparatus in standby is as a backup router.

FIG. 1 is a diagram showing a system example that the hosts 103 on a LAN are to access a wide-area network 107 by accessing a master router 101 and backup router 102 through a network 104, 105. Here, the networks 104 and 105 may be the same sub-network or different sub-networks from each other. Meanwhile, physical-layer characteristic may be different from each other in between the networks 104, 105. Furthermore, the backup router 102 may exits in plurality.

Figure 2:
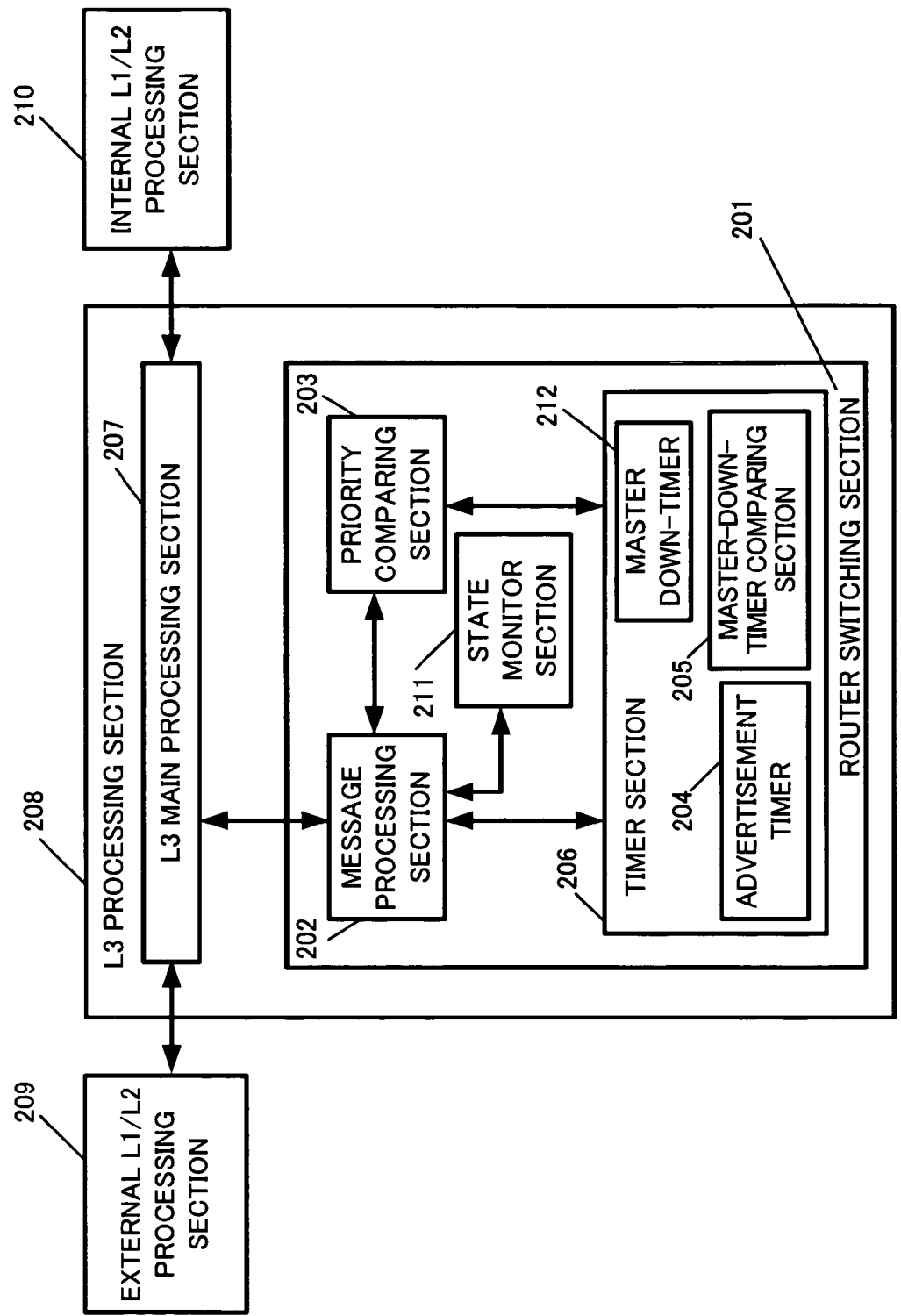
FIG. 2 is a block diagram of a network connection apparatus according to embodiment 1 of the invention.

FIG. 2 is a block diagram showing a network connection apparatus of the invention which is constituted by an L3 processing section 208, an external L1/L2 processing section 209 and an internal L1/L2 processing section 210.

The external and internal L1/L2 processing sections 209, 210 are to carry out a physical-layer and link-layer processing, to make a physical access to an external network and an internal network, respectively. The external L1/L2 processing section 209 and the internal L1/L2 processing section 210 may be, for example, of wireless LAN, HIPERLAN, Bloetooth, UWB, IrDA, ADSL, PDC, GSM, IMT2000, IEEE1394, USB or the like as defined under IEEE802.3 or IEEE802.11 (A, B, E, G).

The L3 processing section 208 is constituted by an L3 main processing section 207 for packet transmission and reception processes in the network layer, and a router-switch processing section 201 for a switchover processing between the master router 101 and the backup router 102. The L3 main processing section, when receiving an advertisement message from the internal L1/L2 processing section 210, delivers the advertisement message to the router-switchover processing section 201. Meanwhile, when receiving an advertisement message from the router-switchover processing section 201, it carries out a processing to deliver the advertisement message to the internal L1/L2 processing section 210. Meanwhile, although not depicted in FIG. 2, the network connection apparatus 208 of the invention may have an upper-layer processing section for processing in such an upper layer as a transport layer, a session layer, a presentation layer and an application layer. In such a case, information is to be exchanged with the L3 processing section 208.

The router-switchover processing section 201 is constituted by a message processing section 202, a priority comparing section 203, a state monitor section 211 and a timer section 206. The timer section 206 is formed by an advertisement timer 204, a master down-timer 205 and a master-down-timer comparing section 212. The router-switchover processing section 201 has a function to designate a preempt mode for switching the router according to a priority, and a non-preempt mode not for switching the router according to a priority. In the non-preempt mode, there is no switching in the relationship of master and backup except for the occurrence of a shutdown event. Hence, explanation is made as to preempt mode in the below.

The message processing section 202 makes a processing to generate, send and receive advertisement messages to be sent at a regular interval by the master router 101. The message processing section 202, when receiving an advertisement message from the L3 main processing section 207, extracts the priority information stored in a priority field 53 of the advertisement message, and delivers it to the priority comparing section 203. In the case the relevant apparatus is a backup router, the master down-timer 205 is monitored when a preparing instruction for an advertisement message is received from the priority comparing section 203. When the master down-timer 205 is expired, an advertisement message is prepared and delivered to the L3 main processing section 207. The message processing section 202 furthermore set an advertisement interval to the advertisement timer 204 and starts it up. Meanwhile, in the case the relevant apparatus is a master router, the advertisement timer 204 is monitored.

When the advertisement timer 204 expires, an advertisement message is prepared and delivered to the L3 main processing section 207.

The priority comparing section 203 is stored with priority information about the relevant apparatus. In the case any of the advertisement timer 204 and the master-down-timer 205 expires or an advertisement packet received has a priority of the lowest "0", the priority information of the relevant apparatus is delivered to the message processing section 202, thereby instructing it to generate an advertisement message.

Meanwhile, the priority comparing section 203, when receiving the priority information from the message processing section 202, compares it with the priority of the relevant apparatus. In the case the priority of the relevant apparatus is higher, the message processing section 202 is instructed to generate an advertisement message and the timer section 206 is instructed to update the master-down-timer 205.

The state monitor section 211 records and manages whether the relevant apparatus is currently in operation as a master router, in standby as a backup router or in initialization state. These states are decided by a reference to an advertisement message received from the message processing section 202, a priority comparing section 203 or a timer section 206.

During turning on the power or upon the occurrence of a shutdown event, a flag representative of initialization phase is recorded to the state monitor section 211. The state monitor section 211, in initialization state, looks up the priority comparing section 203 so that it records a flag representative of master phase state when the priority of the relevant apparatus is the highest. In the case not the highest, recorded is a flag representative of a backup phase.

Meanwhile, the master down-timer 205 expires in the backup phase, recorded is a flag representative of master phase. Meanwhile, the state monitor section 211 records a flag representative of backup phase when shown from the message processing section 202 a reception of an advertisement message indicative of higher priority than the priority of the relevant apparatus from another router.

The timer section 206 possesses the advertisement timer 204 to be started up when the relevant apparatus is a master router 101, a master down-timer 205 to be started up when the relevant apparatus is a backup router and the master-down-timer comparing section 212 for comparing between the remaining time of the master down-timer and the start time of up to a switchover process according to a priority of the relevant apparatus (hereinafter, referred to as "skew time"). The skew time is calculated by (Equation 1).

$$\text{Switchover process Start Time} = (256 - \text{priority})/256 \tag{1}$$

where the priority is assumably a value of 0 to 255.

The advertisement timer 204, when the message processing section 202 sends an advertisement message, is set with an advertisement interval time, thus being used to send advertisement messages at a regular interval.

The master down-timer 205 is to monitor whether the master router 101 is in operation or not. When there is a notification, from the priority comparing section 203, of a reception of an advertisement message higher in priority than the relevant apparatus, the master down-time is updated to a value of master down interval, to start a count of the master down-timer.

Here, master down-interval is set such that the master down-timer expires in the order of the router higher in priority, by providing a weighting according to the priority, as in the following (Equation 2). For example, setting can be with an advertisement interval of 1 second, N of 3 and a skew time of (256−priority)/256 seconds.

$$\text{Master down interval} = \text{advertisement interval} \times N + \text{skew time} \quad (2)$$

When the master down-timer comparing section 212 decides that the priority of the relevant apparatus is higher, the master-down-timer comparing section 212 compares between a master down-timer remaining time and a skew time commensurate with the priority of the relevant apparatus, to set a shorter time to the master down-timer. Incidentally, in the use of application for monitoring an advertisement message from the master router, the master down-timer 205 corresponds to a message timer section while, in the use of application for counting a time of from a standby state to operating state by setting a skew time, the master down-timer 205 corresponds to a master transition timer section.

Now, explanation is made on the phase (master phase or backup phase) switchover operation of between the master router 101 and the backup router 102.

Figure 3:
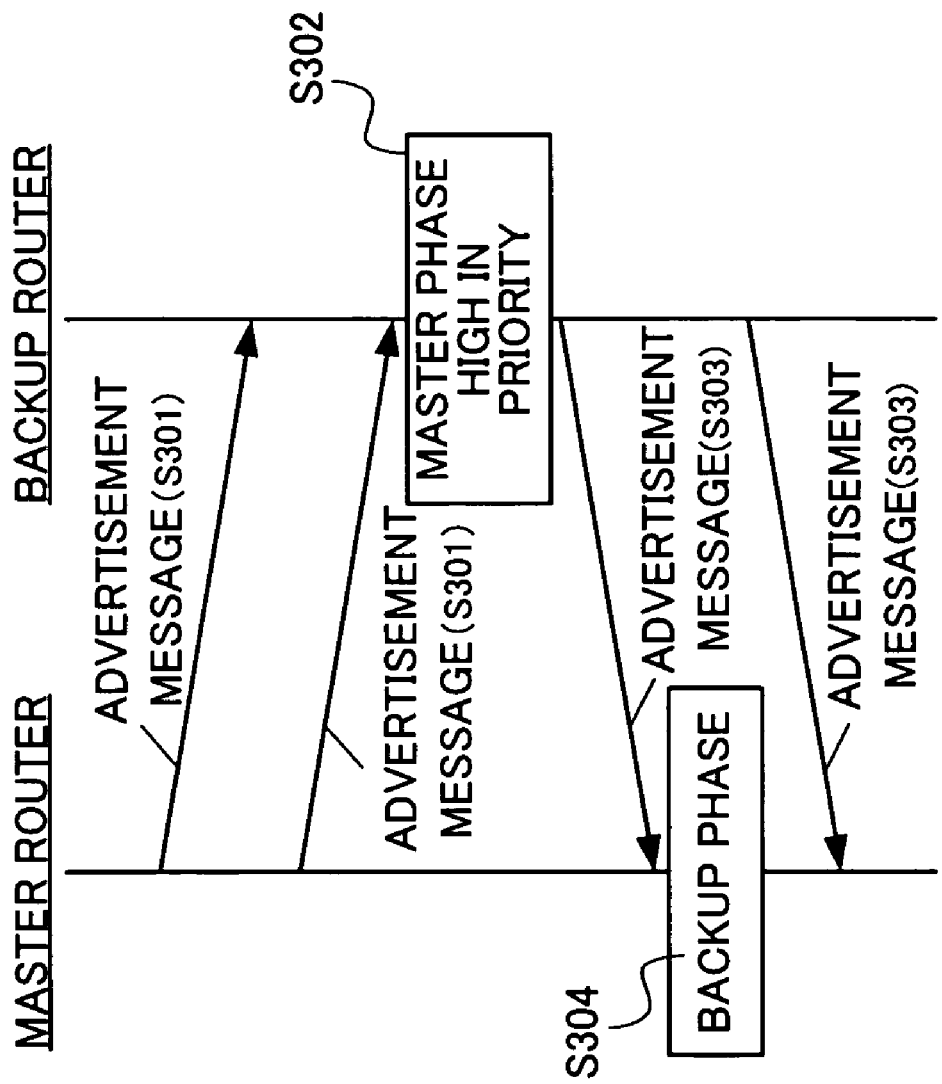
FIG. 3 is a figure showing a sequence of a network connection switching method according to embodiment 1 of the invention.
Figure 14:
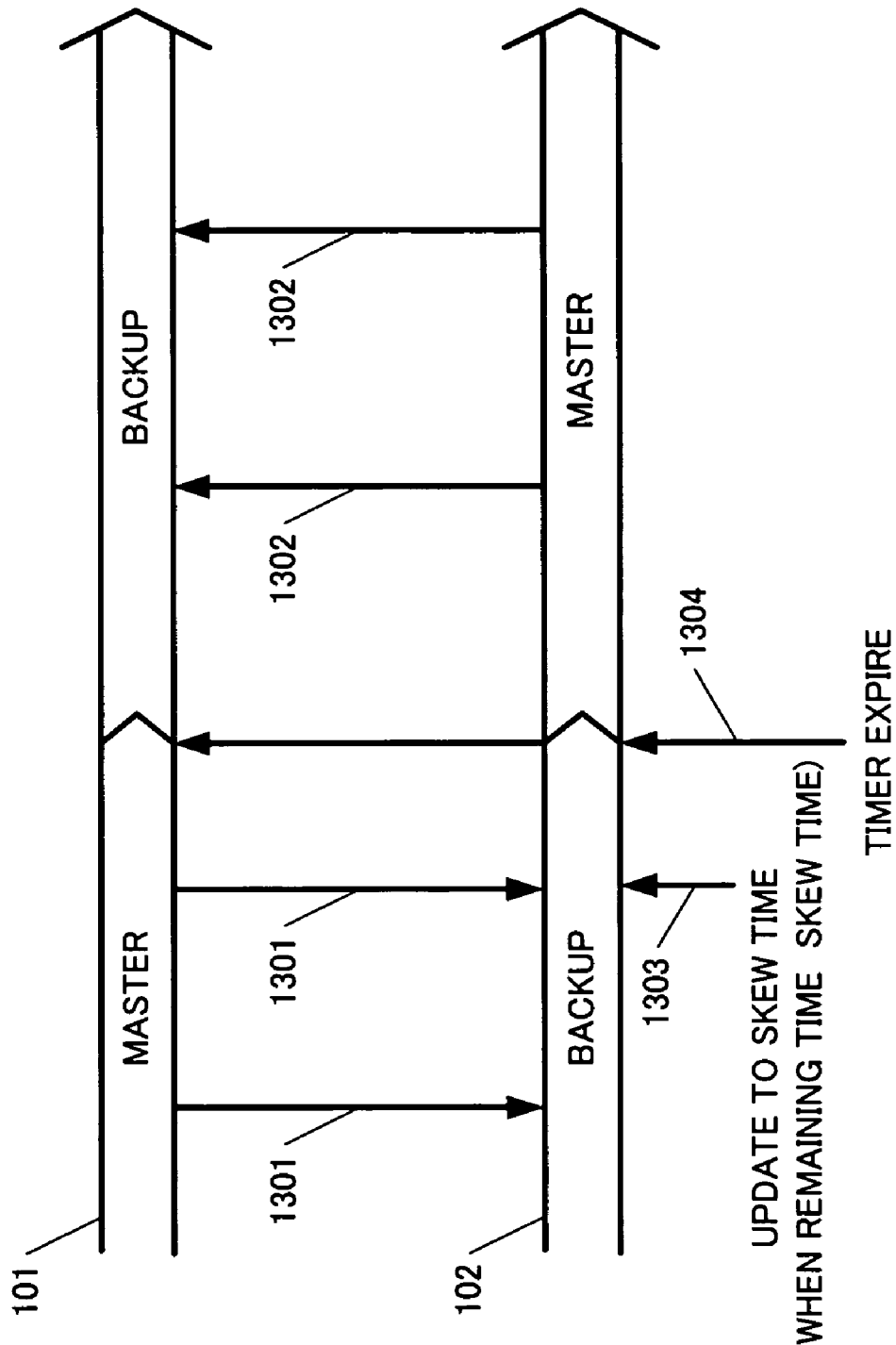
FIG. 14 is a figure showing a sequence of a network connection switching method according to embodiment 1 of the invention.

FIGS. 3 and 14 show a sequence for switching the role of the master router 101 and backup router 102 where there is a backup router higher in priority than the router assuming the master router 101.

In FIG. 3, the master router 101 is sending advertisement messages 1301 at a regular interval to the backup router 102 (step S301). The backup router 101, when the priority information within the advertisement message becomes lower than the priority possessed because of a certain cause, sets a shorter time of the skew time and the master down-timer's remaining time (1303) and transits into a master phase (step S302), to send the advertisement message 1302 by multicast to other routers including the present master router 101 (step S303). Due to this, the backup router higher in priority and going into time-up earlier is to send this advertisement message. The backup router 102 highest in priority is switched into a master router. The other backup routers are to receive the advertisement message before reaching time-up, in which case they do not send their own advertisement messages. In this manner, arbitration process is effected between the backup routers.

Meanwhile, the present master router 101 transits to the backup phase by receiving the advertisement message 1302 from the router higher than the priority possessed (step S304), thus becoming a backup router. After switchover, the backup router 102, assuming as a master router, sends advertisement messages 1302 at a regular interval (step S305).

In this switchover process, the routers decide their roles by transiting through three states of initialization phase, master phase and backup phase. This procedure is explained with use of FIGS. 4 to 6.

Figure 4:
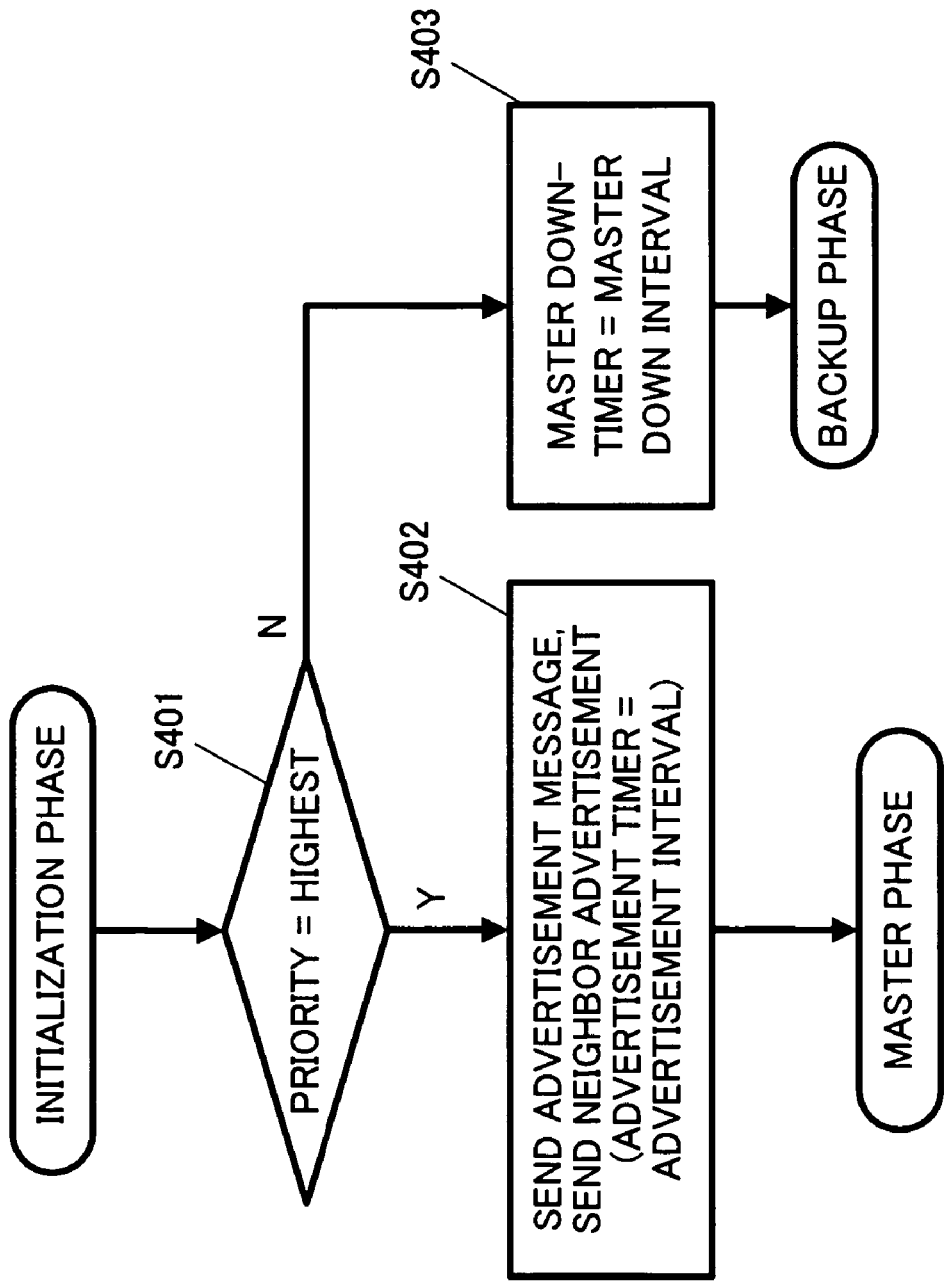
FIG. 4 is a figure showing a procedure in an initialization phase of the network connection switching method according to embodiment 1 of the invention.

FIG. 4 shows a procedure in the initialization phase for transition where power is being on immediately after the occurrence of a shutdown event, which is explained below. Here, shutdown event is a process to reset the router itself. For example, it takes place when disconnected from the internal or external network, power is put off or at a constant time, or otherwise can be established by the user.

When the router transits into initialization phase, the priority comparing section 203 decides whether the priority possessed is the highest or not (step S401). In the case the highest, notification is made to the message processing section 202, to set its own priority in a priority field of the advertisement message shown in FIG. 26, thus effecting a process to send the advertisement message to other routers and a process to send a neighbor advertisement message to the neighborhood host. Incidentally, the neighbor advertisement message is a message in a neighbor discoery protocol over an IP network, including virtual router IP addresses and virtual router MAC addresses.

Meanwhile, the priority comparing section 203 sets an advertisement interval to the advertisement timer 204 of the timer section 206 (step S402). Thereafter, the router transits to master phase. Here, the advertisement interval may be set freely, e.g. standard value is taken 1 second.

Meanwhile, at step S401, the priority comparing section 203, when the priority of the relevant apparatus is not the highest, sets a master down interval to the master-down-timer 205, thus transiting to backup phase.

Figure 5:
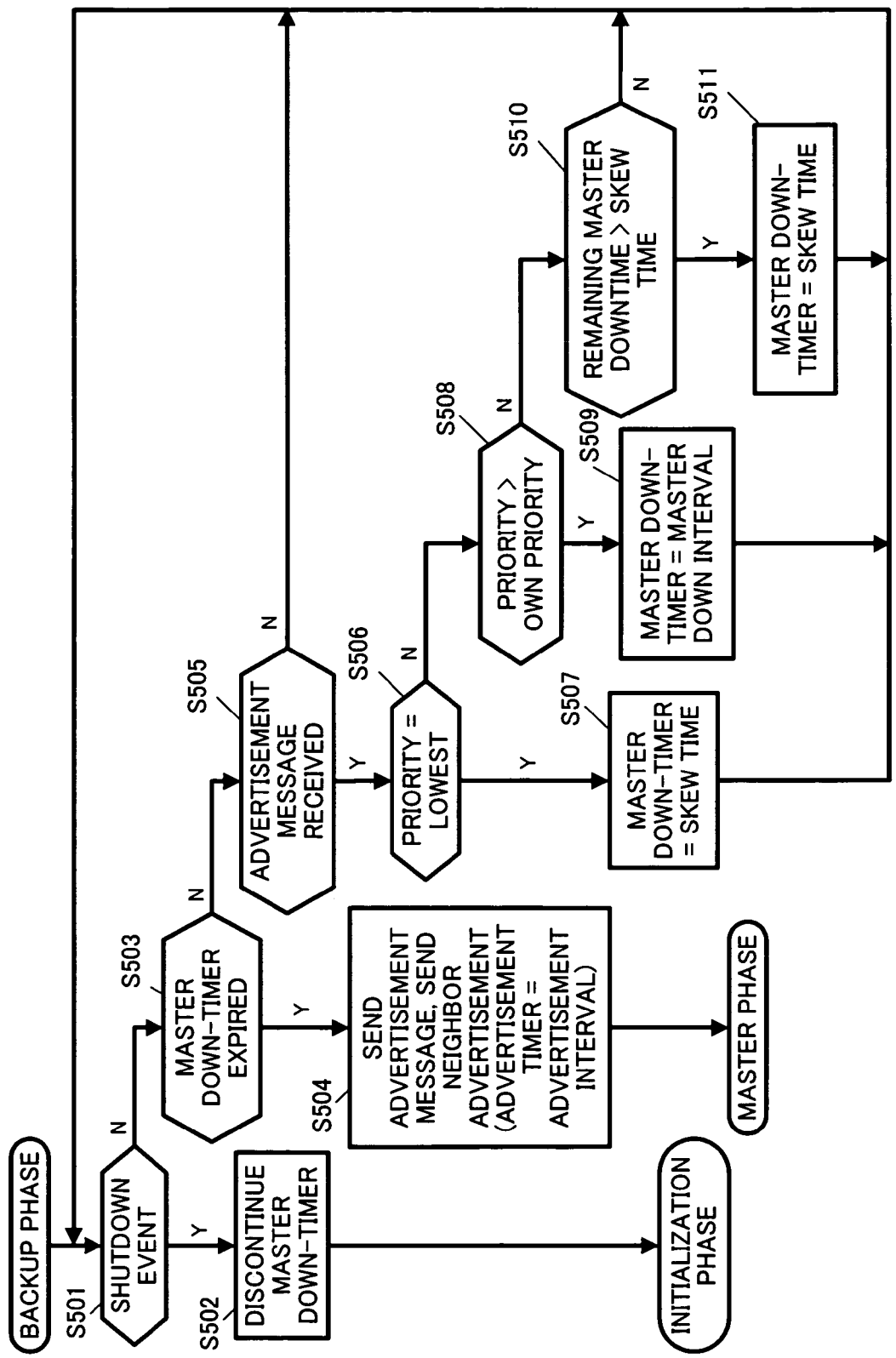
FIG. 5 is a figure showing a procedure in a backup phase of the network connection switching method according to embodiment 1 of the invention.

Now, one procedure example in the backup phase is shown in FIG. 5, which is explained below.

At first, the state monitor section 211 monitors a shutdown event (step S501). In the case of an occurrence of the event, the master down-timer 205 immediately discontinues from counting (step S502) and the router transits to the initialization phase.

The state monitor section 211, during counting of the master down-timer 205, decides whether the timer has expired or not (step S503). Upon expire of the master down-timer 205, notification is made to the message processing section 202, thus effecting the processing to send an advertisement message and a neighbor advertisement message. Meanwhile, the state monitor section 211 starts up the advertisement timer 204 to make a setting process to the advertisement interval (step S504). Thereafter, the router transits to the master phase.

At step S503, in case receiving the advertisement message from the master router 101 before expiration of the master down-timer 205 (step S505), it is decided whether the priority in the message is the lowest or not (step S506). When in the lowest, the state monitor section 211 sets the master down-timer 205 with a skew time (step S507), and the process returns to step S501.

When the priority in the advertisement message is not the lowest, comparison is made with the priority of the relevant apparatus (step S508). The priority in the received advertisement message is equal to or higher than the priority of the relevant apparatus, the master down-timer 205 is set again with a master down interval (step S509) and the process returns to step S501. Meanwhile, in the case the priority of the relevant apparatus is higher than the advertisement message received, it is decided whether the remaining time of the master down-timer 205 is greater than the skew time or not (step S510). When the remaining time of the master down-timer 205 is greater, the master down-timer 205 is set to the skew time (step S511) and the process returns to step S501. When the remaining time of the master down-timer 205 is equal to smaller than the skew time, the process directly returns to step S501.

Note that similar effect is obtainable where the procedure of step S505 and the subsequent is given as follows.

Namely, after the decision as a reception of an advertisement message, in the case the priority in the received advertise message is the lowest or the priority of the relevant apparatus is greater and the remaining time of the master down-timer 205 is greater than the skew time, the master down-timer 205 is set with the skew time, and the process returns to step S501. Where not fallen under the above condition, the master down-timer 205 is set with the master down interval and the process returns to the step S501.

Meanwhile, at step S505, when there is no detection of an advertisement message reception, the process returns to any of the steps S501 and 503. Incidentally, similar effect is obtainable in case the steps S501, S503 and S505 are replaced in order.

Figure 6:
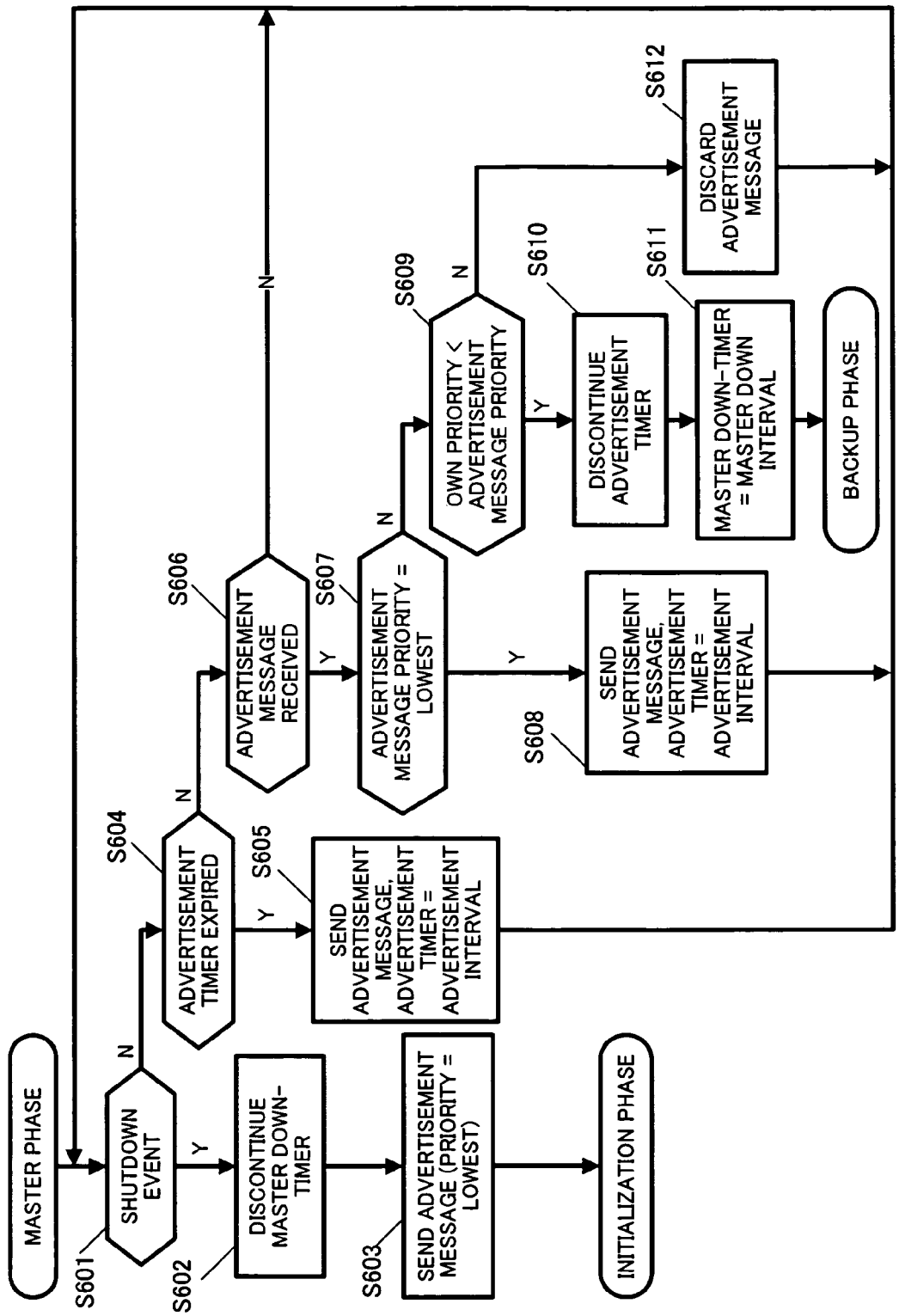
FIG. 6 is a figure showing a procedure in a master phase of the network connection switching method according to embodiment 1 of the invention.

Now, one procedure example in the master phase is shown in FIG. 6, which is explained below.

At first, the state monitor section 211 monitors a shutdown event (step S601). In the case of an occurrence of the event, the advertisement timer 204 is immediately discontinued from counting (step S602), to make a notification to the message processing section 202. The message processing section 202 sends an advertisement message set with a priority at the lowest (step S603). Thus, the router transits to an initialization phase.

Meanwhile, in the case there is no occurrence of a shutdown event, the state monitor section 211 decides whether the advertisement timer 204 has expired or not (step S604). When the advertisement timer 204 expires, the state monitor section 211 makes a notification to the message processing section 202, thus effecting a transmission processing of an advertisement message. Meanwhile, the state monitor section 211 makes a processing to again set the advertisement timer with the advertisement interval (step S605). Thereafter, the process returns to step S601.

Receiving the advertisement message from the backup router before expiration of the advertisement timer 204 (step S606), the priority comparing section 203 decides whether the priority in the message is the lowest or not (step S607). When it is the lowest, the priority comparing section 203 makes a notification to the message processing section 202, to effect an advertisement-message transmission process and a process to again set the advertisement timer 204 at the advertisement interval (step S608). Thereafter, the process returns to the step S601.

In the case the priority of the advertisement message is not the lowest, the priority comparing section 203 decides whether the router, having a priority higher than the priority of the relevant apparatus or equal to the priority of the relevant apparatus and from which an advertisement message has been sent, has an IP address greater than the IP address of the relevant apparatus (step S609). In the case of meeting the condition of decision, the advertisement timer 204 is discontinued from counting (step S610). Then, the priority comparing section 203 sets a master down interval to the master down-timer 205, thus transiting to a backup phase. Incidentally, the process for the case with the equal priority is not limited to this but can decide the order based on another predetermined method.

Meanwhile, in the case of not meeting the condition of decision of the step S609, the priority comparing section 203 makes a notification to the message processing section 202, to discard the received advertisement message (step S612), and the process returns to the step S601.

Note that similar operation is obtainable in case the steps S607 and S609 and the steps S601, S604 and S606 are replaced in the order.

As in the above, when the priority of the relevant apparatus is higher than the priority of the advertisement message in the backup phase, comparison is made between the remaining time of the master down-timer and the skew time the priority is weighed, to thereby set again the master down-timer with the shorter time. This can swiftly switch the back up router higher in priority to a master router.

Embodiment 2

Figure 7:
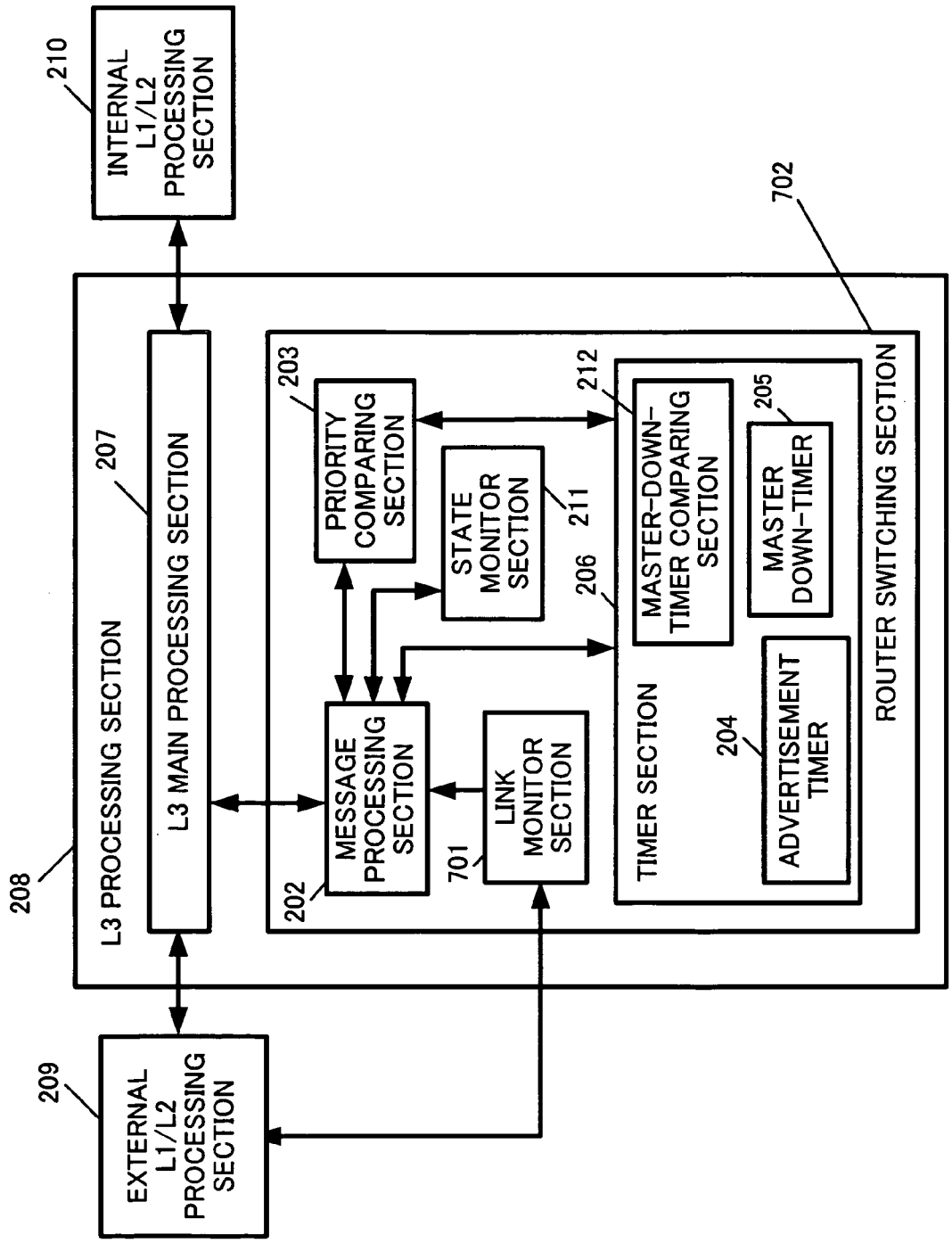
FIG. 7 is a block diagram showing a configuration of the network connection switching apparatus according to embodiment 2 of the invention.

FIG. 7 is a block diagram showing a network connection apparatus of the invention. This is different from embodiment 1 in that a link monitor section 701 is added.

The link monitor section 701 is to receive link information from the external L1/L2 processing section 209 for access to an external network. Here, link information is a piece of information including any of or a plurality of receiving signal strength, BER, FER, retransmit frequency, transmission-signal modulation scheme, transmission bandwidth, transmission capacity and so on. The link monitor section 701 can decide the link quality from those pieces of information, e.g. a receiving signal strength of a beacon signal periodically sent from an access point or a result of calculation on a transmission bandwidth based on the total amount of packets sent under monitoring the communication channel for a constant period in the case the external network is a wireless LAN system conforming to IEEE802.11.

The link monitor section 701, when deciding from the information received from the external L1/L2 processing section 209 that the link quality is equal to or higher than a defined value, delivers a permission for switchover process of between master and backup routers to the message processing section. The message processing section 202, in case receiving the permission, is allowed to implement the processing described in embodiment 1.

Figure 8:
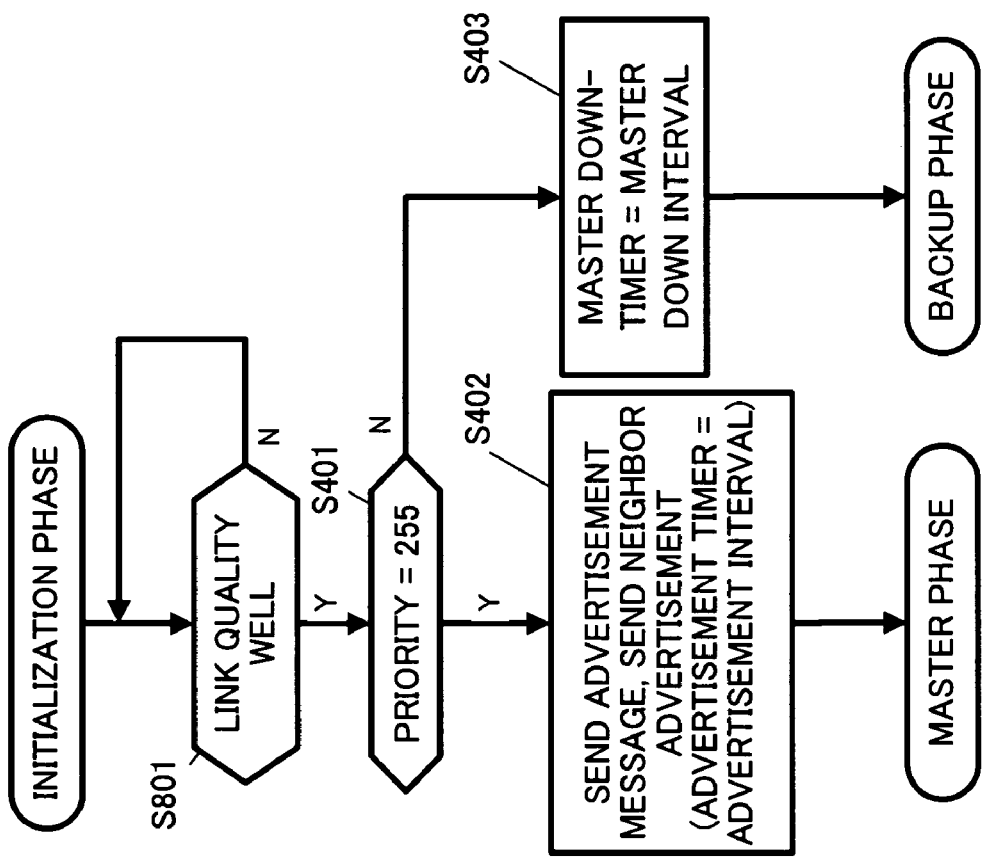
FIG. 8 is a figure showing a procedure in an initialization phase of the network connection switching method according to embodiment 2 of the invention.

FIG. 8 is a flowchart showing a procedure in the initialization phase.

When the router enters an initialization phase, the link monitor section 701 decides whether link quality is equal to or higher than a defined value or not (step S801). When equal to or higher than a defined value, connection performance is decided well. In this case, the process at steps S401-S403 in embodiment 1 is carried out. When link quality is not equal to or higher than a defined value, the process returns to the beginning of initialization phase.

Figure 9:
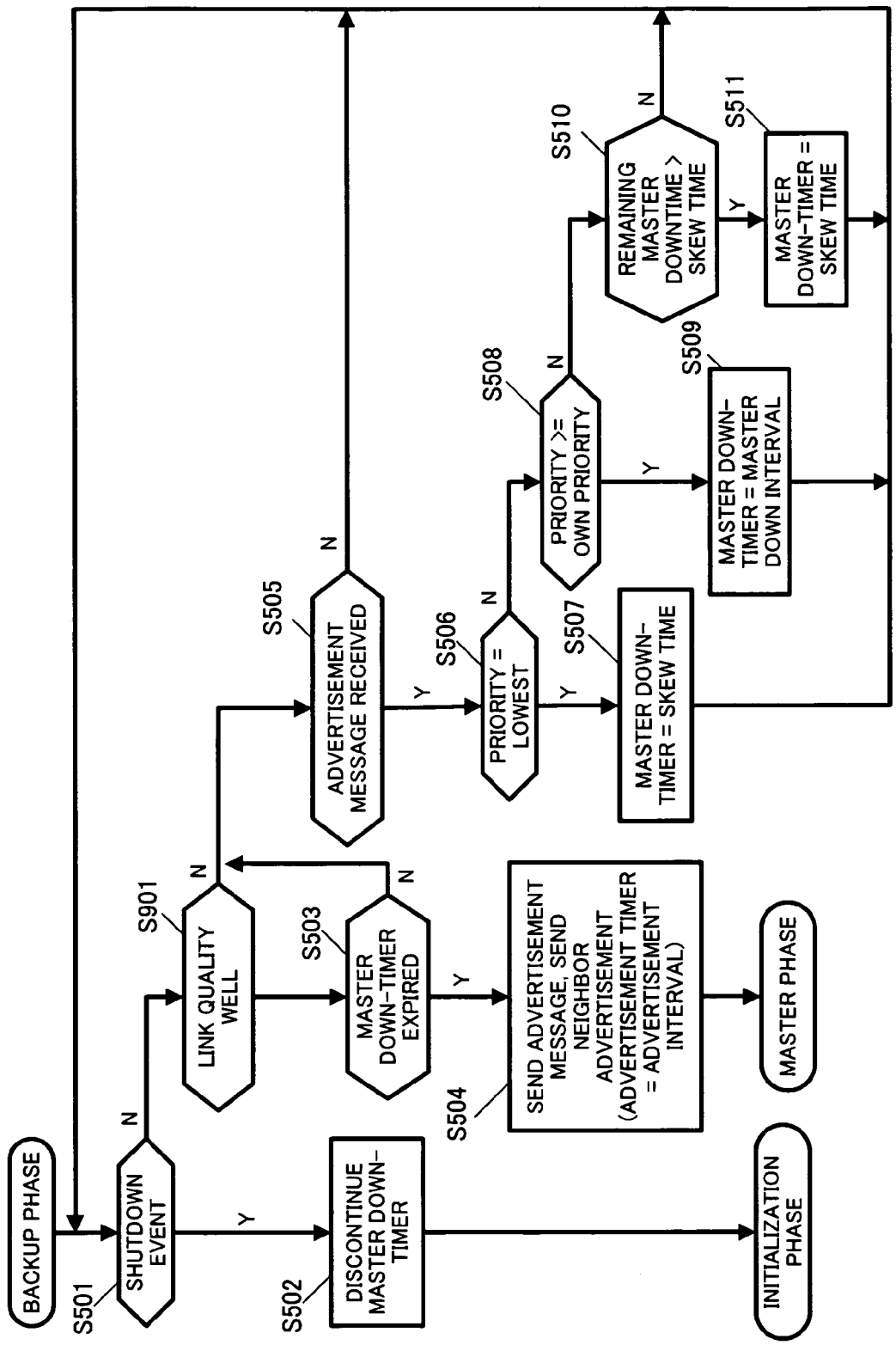
FIG. 9 is a figure showing a procedure in a backup phase of the network connection switching method according to embodiment 2 of the invention.

FIG. 9 shows a procedure in the backup phase.

At step S901, the link monitor section 701 decides in the above manner whether the link quality with external network is well or not (step S901). When well, the process moves to step S503 while, when the link quality is not well, the process moves to step S505. From then on, executed is the process explained in embodiment 1.

As in the above, this embodiment allows only the router well in the link quality with an external network to become a master router due to utilizing the link quality information with the external network before master-backup switchover.

Note that similar operation is obtainable similarly to embodiment 1 where the steps S501, S901 and S505 are replaced in the order.

Embodiment 3

Figure 10:
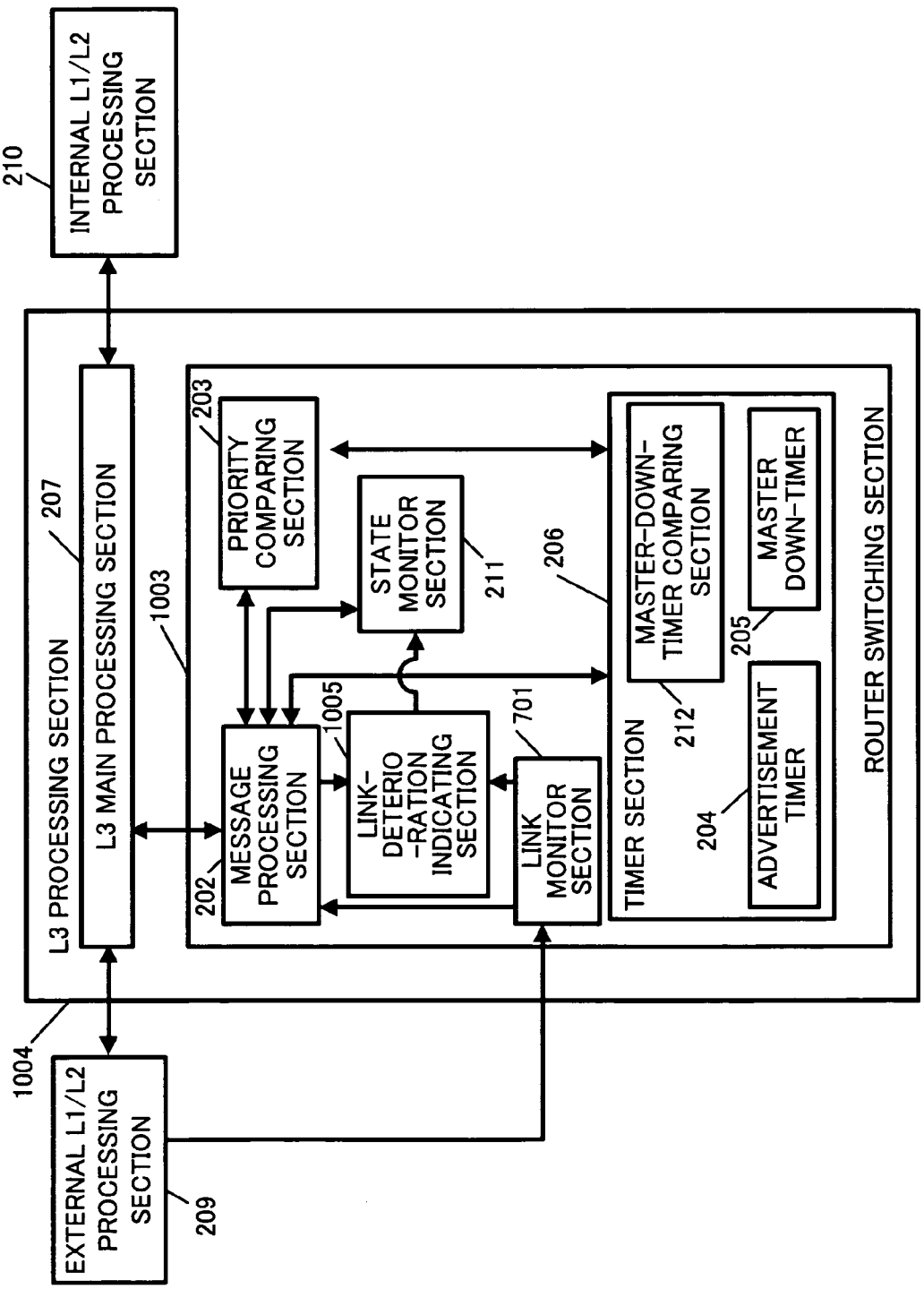
FIG. 10 is a block diagram showing a configuration of the network connection switching apparatus according to embodiment 3 of the invention.

FIG. 10 is a block diagram showing a network connection apparatus of the invention. This is different from embodiment 2 in that a link-deterioration indicator section 1005 is added.

The link-deterioration indicator section 1005 is to establish a setting/resetting of a link-deterioration flag in accordance with link quality. Namely, in the case the state monitor section 211 assumes the relevant apparatus as a master router, the link monitor section 701, in case the link quality is favorable as a result of link quality decision by the same, instructs the link-deterioration indicator section 1005 to reset a link deterioration flag in order to indicate the fact. When link quality is poor, it sets a link deterioration flag.

The message processing section 202, when detecting a link deterioration by means of the link information from the link monitor section 701, sends to other routers an advertisement message set with a priority at the lowest.

Figure 11B:
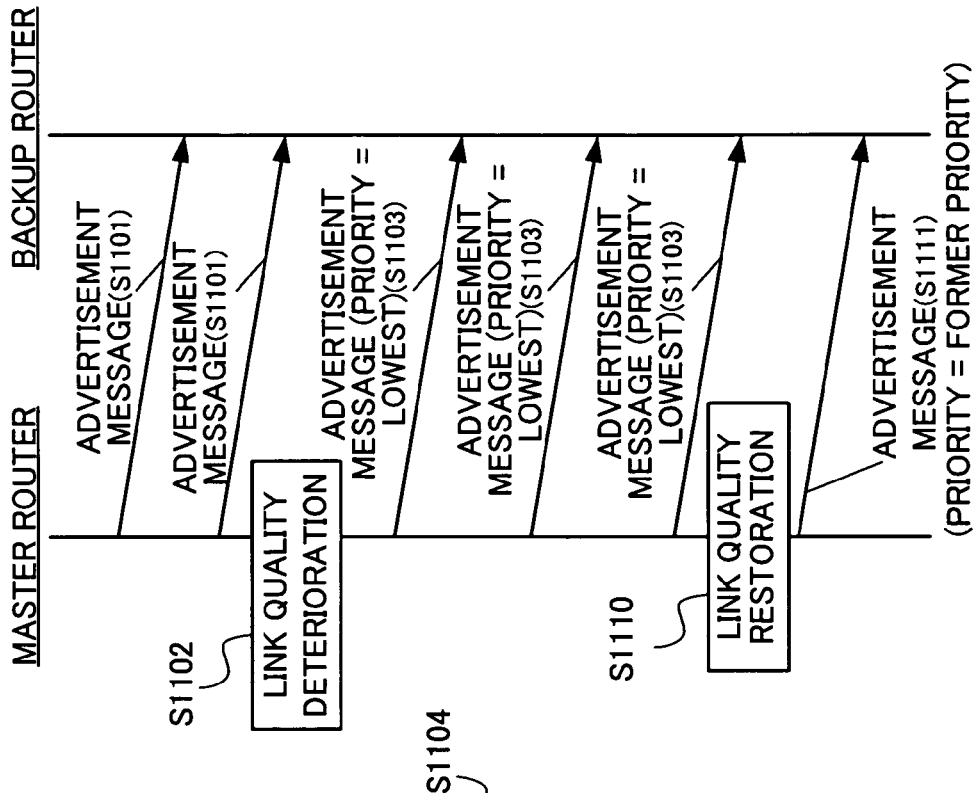
FIGS. 11(a) and 11(b) are a figure showing a sequence of a network connection switching method according to embodiment 3 of the invention.
Figure 11A:
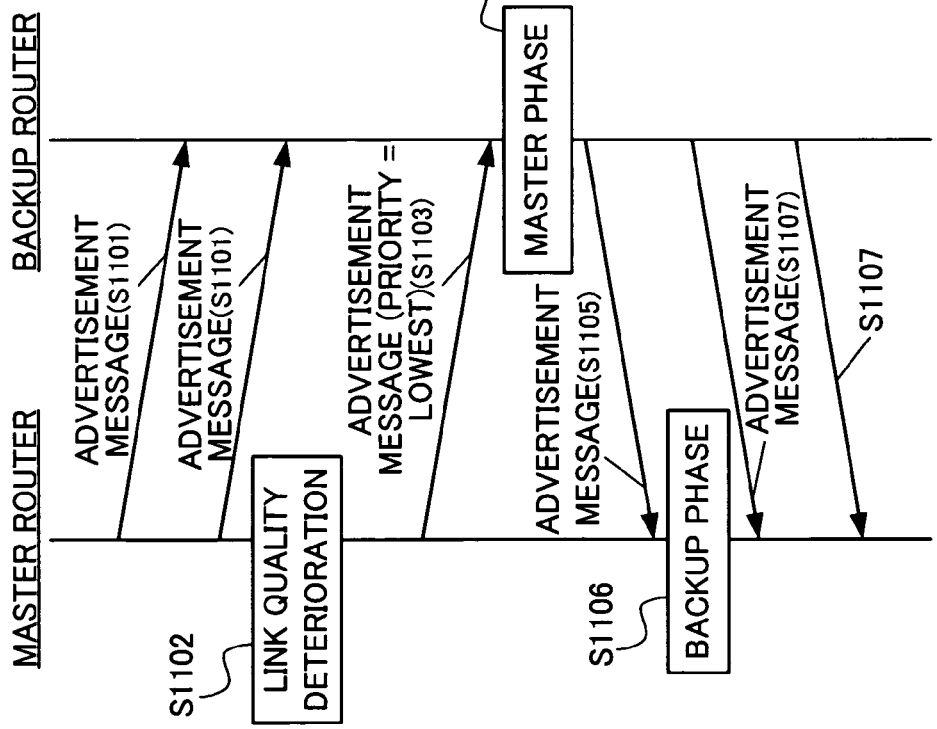

FIG. 11(a) shows a sequence for switching the role over between the master router 101 and the backup router 102 when the link quality is deteriorated at the master router 101.

In FIG. 11(a), the master router 101 sends advertisement messages at a regular interval to the backup router (step S1101). The master router 101, when there is a deterioration in the link quality with an external network (step S1102), sends an advertisement message having a priority 53 rendered the lowest to the backup router (step S1103).

The backup router 102, when receiving the advertisement message having a priority 53 rendered the lowest, becomes a master router after the passage of a skew time (step S1104) in the case the relevant apparatus is allowed to become a master router. Thus, it sends the advertisement message (step S1105).

The router assumed the master router 1101 receives the advertisement message and switches itself into a backup router (step S1106).

The router became a master router, after completed of switchover, is to send advertisement messages at a regular interval (step S1107).

Incidentally, when the master router 101 is sending an advertisement message set with a priority at the lowest as shown in FIG. 11(b), the advertisement messages are continuously sent where there are no backup routers to respond the same (step S1103). When the link quality at the master router is restored (step S1110), an advertisement message is again sent whose priority is returned to the former priority (S111).

In the switchover process over between the master and backup routers, the routers are decided in their roles through the transition of three states of initialization phase, master phase and backup phase. This procedure is explained by use of FIGS. 12 and 13. Incidentally, embodiment 2 is applicable as to initialization and backup phases.

Figure 12:
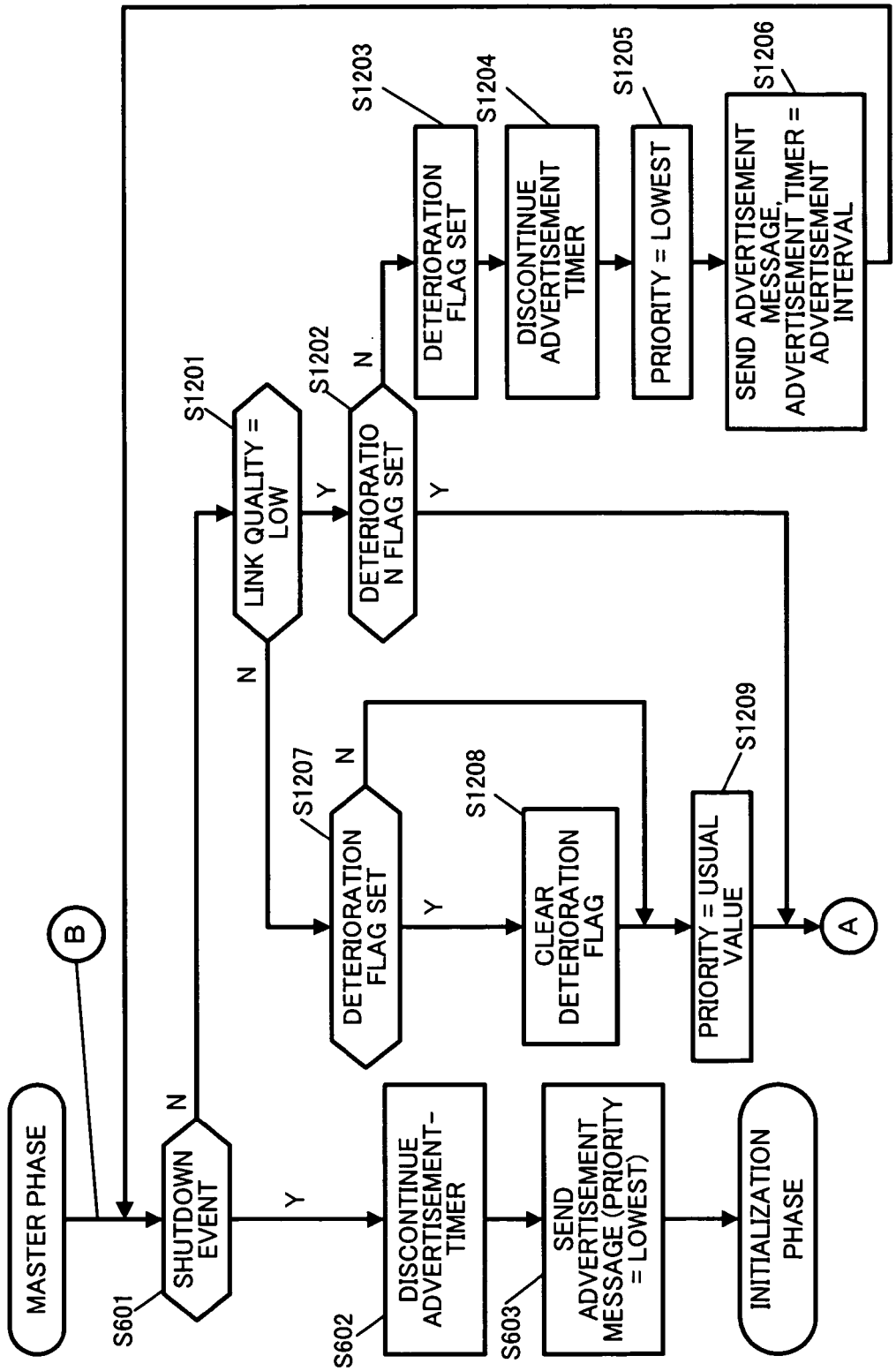
FIG. 12 is a figure showing a part of a procedure in a master phase of the network connection switching method according to embodiment 3 of the invention.
Figure 13:
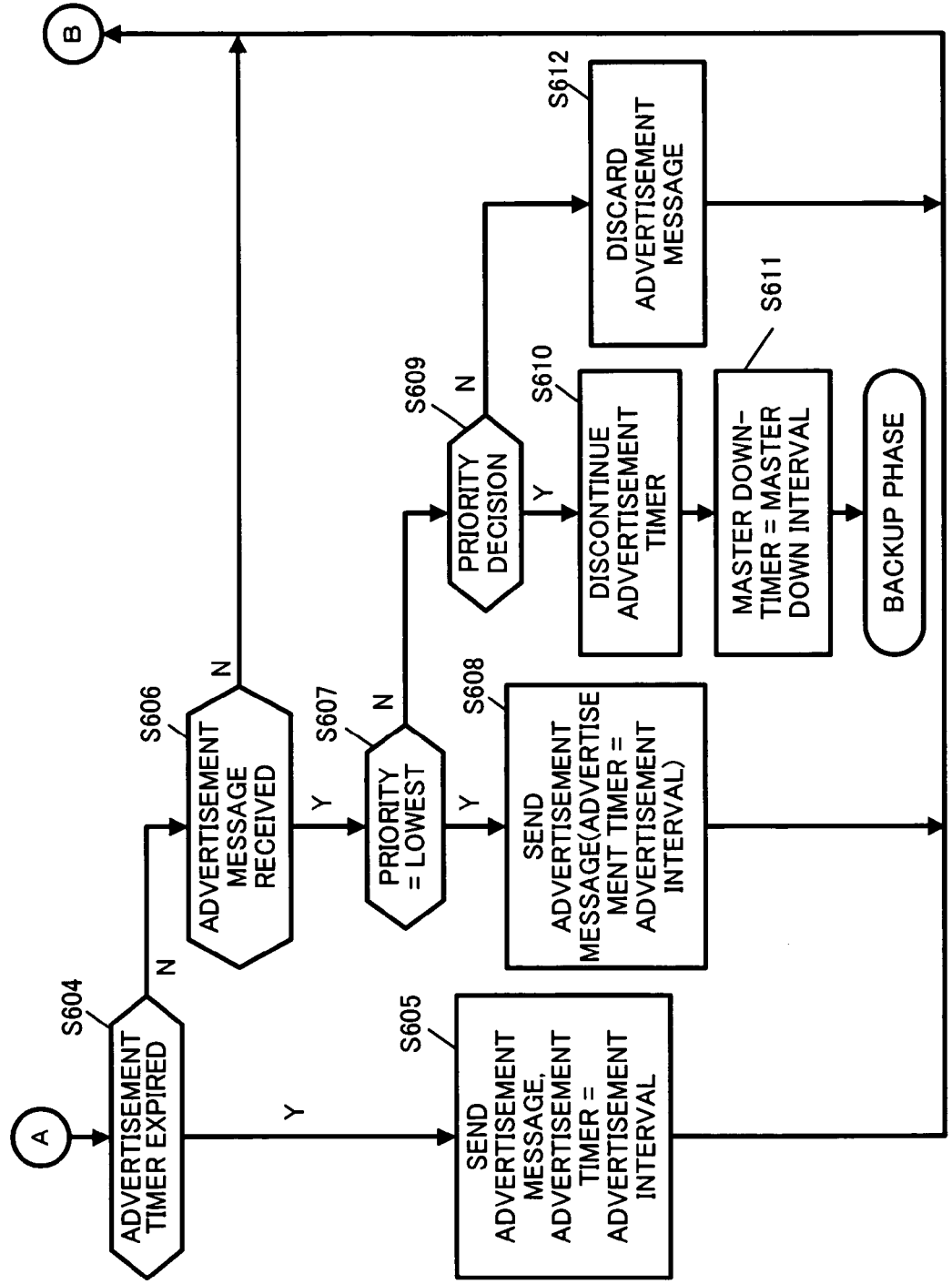
FIG. 13 is a figure showing a part of the procedure in a master phase of the network connection switching method according to embodiment 3 of the invention.

FIGS. 12 and 13 are charts showing one procedure example in the master phase. This is different in that there is added a process to monitor link quality. Note that "A" in FIG. 12 is continued to "A" in FIG. 13 while "B" in FIG. 13 is continued to "B" in FIG. 12.

The link monitor section 701 monitors link quality (step S1201). In the case of a worse link quality, it is decided whether the deterioration flag is being set or not (step S1202). The link monitor section 701, in the case there is no setting of a deterioration flag, decides that the link quality deteriorates from a favorable state, and instructs the link-deterioration instructing section 1005 to set a deterioration flag (step S1203). Meanwhile, the link monitor section 701 causes the advertisement timer 204 to discontinue from counting (step S1204) and makes a notification to the message processing section 202 to carry out a process to send an advertisement message set with a priority at the lowest (step S1206). Thereafter, the process returns to step S601.

At step S1202, when there is a setting of a deterioration flag, it is decided whether the advertisement timer 204 has expired or not, in order to send an advertisement message (step S604). The process of step S604 and the subsequent is similar to embodiment 1. However, because link quality is low in this case, the advertisement message to send at step S605 has a priority 53 assuming the lowest value.

At step S1201, when the link quality is favorable, it is decided whether there is a setting of a deterioration flag or not (step S1207). When there is a setting of a deterioration flag, the link quality is assumably restored to a favorable state. The link-deterioration instructing section 1005 is instructed to clear the deterioration flag (step S1208). After returning the priority to the normal value (S1209), the process proceeds to step S604. When there is no setting of a deterioration flag, the process proceeds to step S1209.

Incidentally, similar effect is obtainable in case the steps S601, S1201, S604 and S606 in the decision process are replaced in the order.

As in the above, in the present embodiment, the sole backup router favorable in the link quality with an external network is allowed to make a process to become a master router, in the process of master-backup switchover process. Meanwhile, the master router, even where link quality deteriorates but there are no switchable backup routers, it operates as a master router as it is. Because the priority is returned to the former in case the link quality is restored, the network connection apparatus favorable in link state is preferentially allowed to become a master router. Meanwhile, prior to link disconnection, it is possible to establish a backup router next to become a master router.

Embodiment 4

The network connection apparatus in the present embodiment is similar in configuration to embodiment 3 except for the difference in that the message processing section 202 further has a function to prepare and interpret a switchover request message.

Figure 15A:
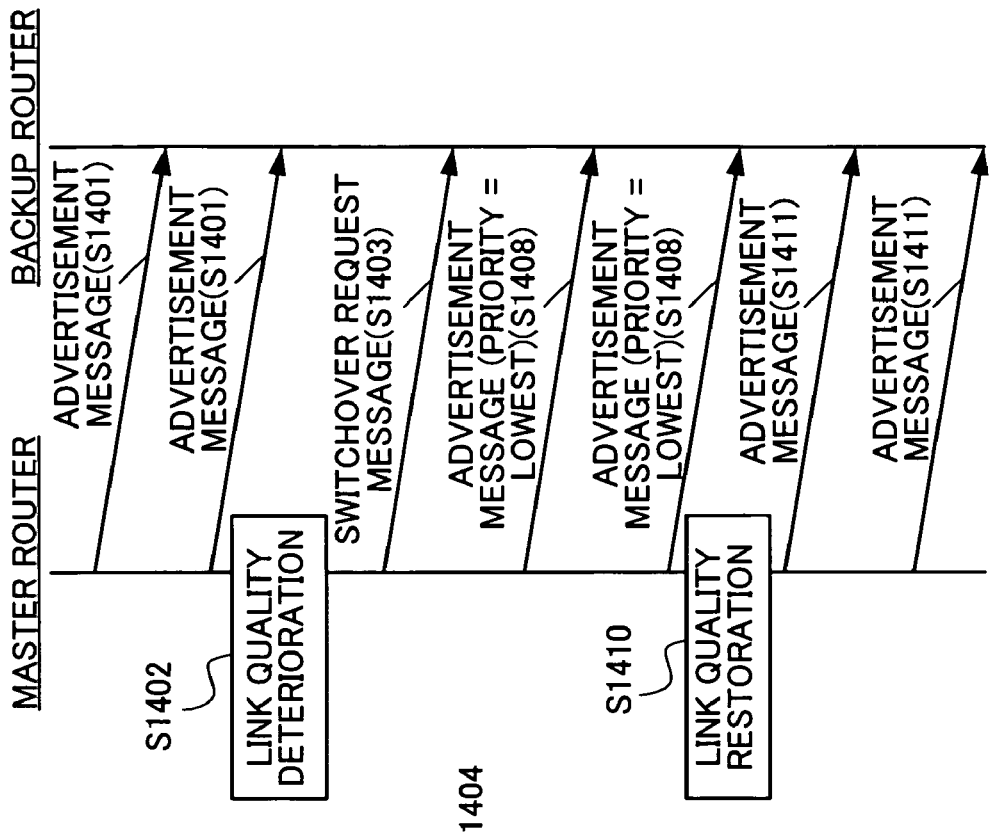
FIGS. 15(a) and 15(b) are a figure showing a sequence of a network connection switching method according to embodiment 4 of the invention.

FIG. 15(a) shows a sequence for switching the role over between the master router 101 and the backup router 102 in the case the link quality deteriorates in the master router 101.

The master router 101 is sending advertisement messages at a regular interval to the backup router (step S1401). The master router 101, when there is a deterioration in the link quality with an external network (step S1402), sends a switchover request message to the backup router 102 (step S1403). The backup router 102, after receiving the switchover request message, becomes a master router after the lapse of a skew time (step S1404) and sends an advertisement message (step S1405) in the case it can become a master router.

Meanwhile, the master router 101, when receiving the advertisement message from the backup router 102, switches its state to a backup phase. This completes the switchover process between master and backup routers (step S1406). After terminating the switchover process, the backup router assuming a master router sends advertisement messages at a regular interval (step S1407).

Figure 15B:
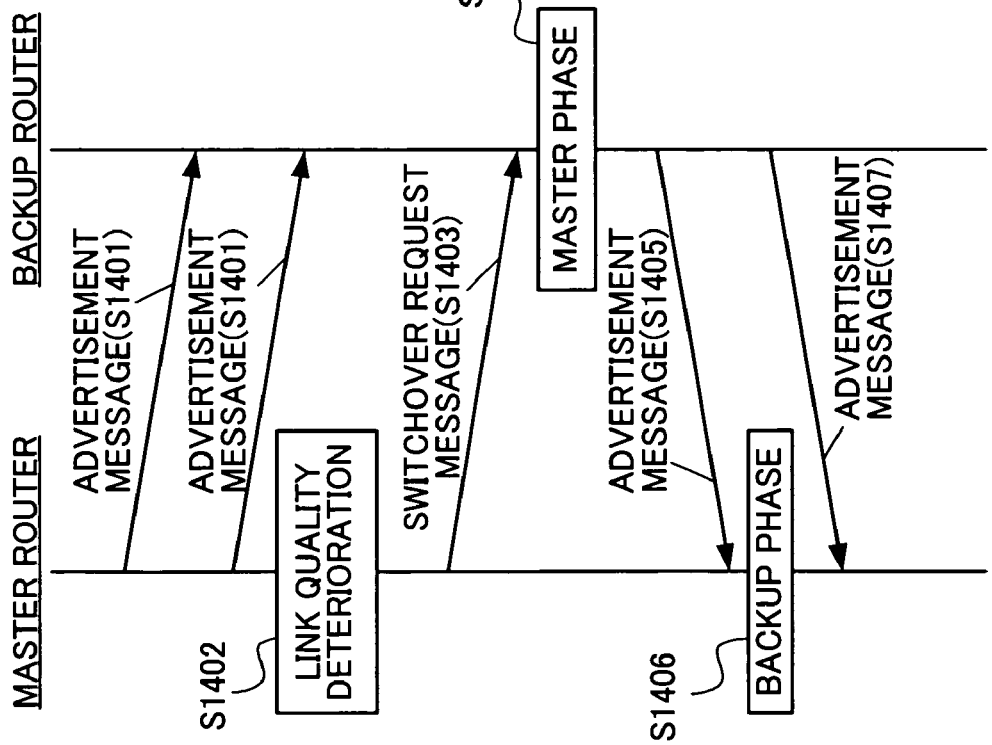

Incidentally, in the case the link quality is restored in the state the master router 101 has not received an advertisement message from the backup router 102 as shown in FIG. 15(b), it returns the priority to the former one (step S1410) and sends an advertisement message (step S1411).

In the master-backup switchover process, the routers decide their roles by the transitions through three states of initial phase, master phase and backup phase. This procedure is explained by use of FIGS. 16 to 18. Incidentally, embodiment 3 is applicable as to initialization phase.

Figure 16:
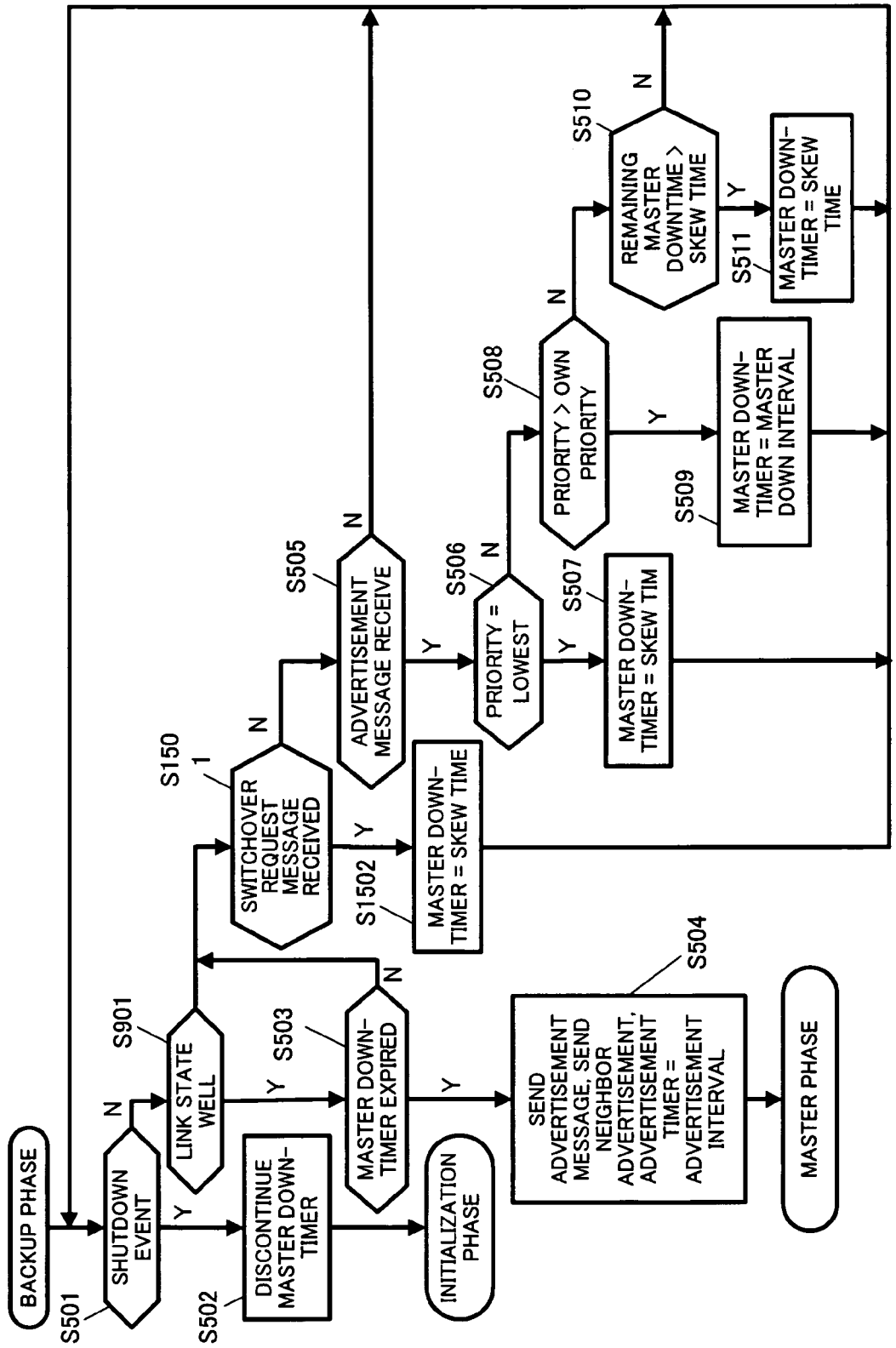
FIG. 16 is a figure showing a procedure in a backup phase of the network connection switching method according to embodiment 4 of the invention.

FIG. 16 shows a procedure in the backup phase. In the backup phase, monitored are a shutdown event, link quality, a switchover request message reception and an advertisement message reception.

In the link quality monitor process, it is decided whether the link quality with an external network is favorable or not (step S901). In the case it is favorable, the process moves to step S503. In the case the link quality is not favorable, the process moves to a process to decide whether a switchover request message has been received or not (step S1501). In the case of having received a switchover request message, the master down-timer 205 is set at a skew time (step S1502), and the process returns to the step S501.

Meanwhile, in the case not having received a switchover request message, decision is made as to an advertisement message reception (step S505). From then on, the process is the same as the explanation in embodiment 3.

Note that similar operation is obtainable in case the steps S501, S901, S1501 and S505 are replaced in the order.

Figure 17:
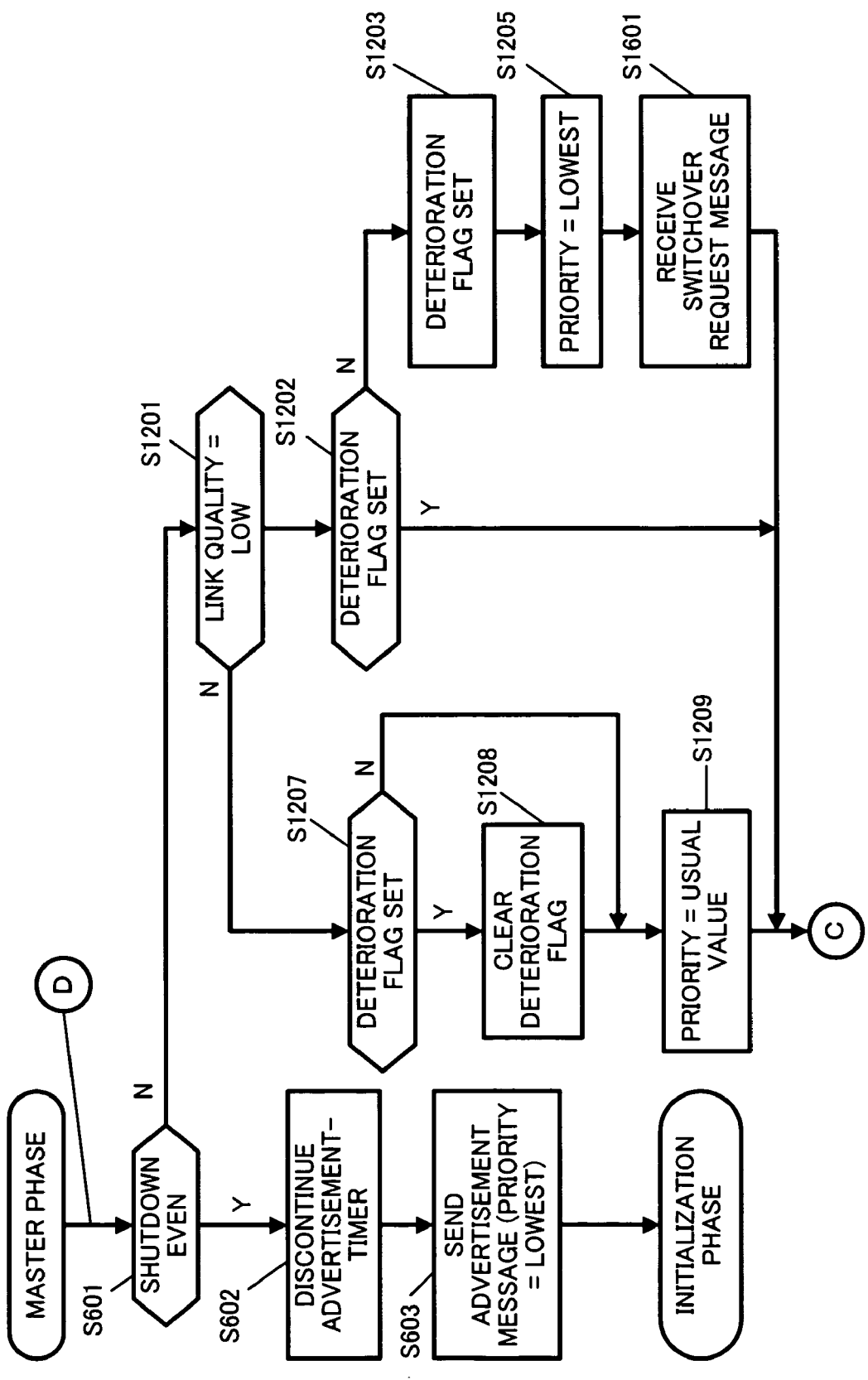
FIG. 17 is a figure showing a part of a procedure in a master phase of the network connection switching method according to embodiment 4 of the invention.
Figure 18:
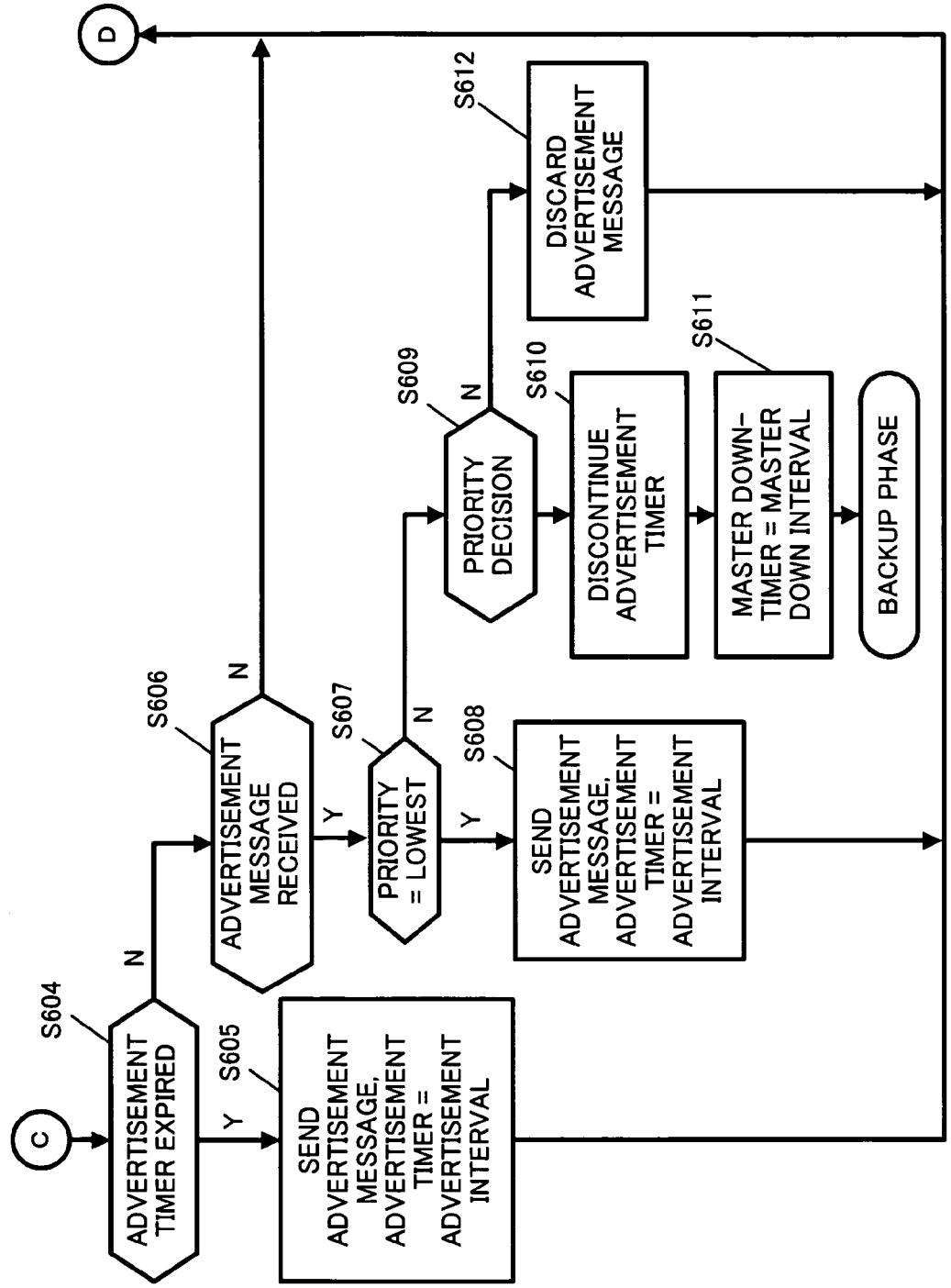
FIG. 18 is a figure showing a part of the procedure in a master phase of the network connection switching method according to embodiment 4 of the invention.

FIGS. 17 and 18 are charts showing one procedure example in the master phase. This is the same in basic procedure as embodiment 3 except for the difference in that, when first detecting a link quality deterioration, a deterioration flag is set (step S1203) so that, after the priority is set at the lowest (step S1205), a switchover request message is sent to a backup router (step S1601). Note that "C" in FIG. 17 is continued to "C" in FIG. 18 while "D" in FIG. 18 is continued to "D" in FIG. 17.

Figure 26:
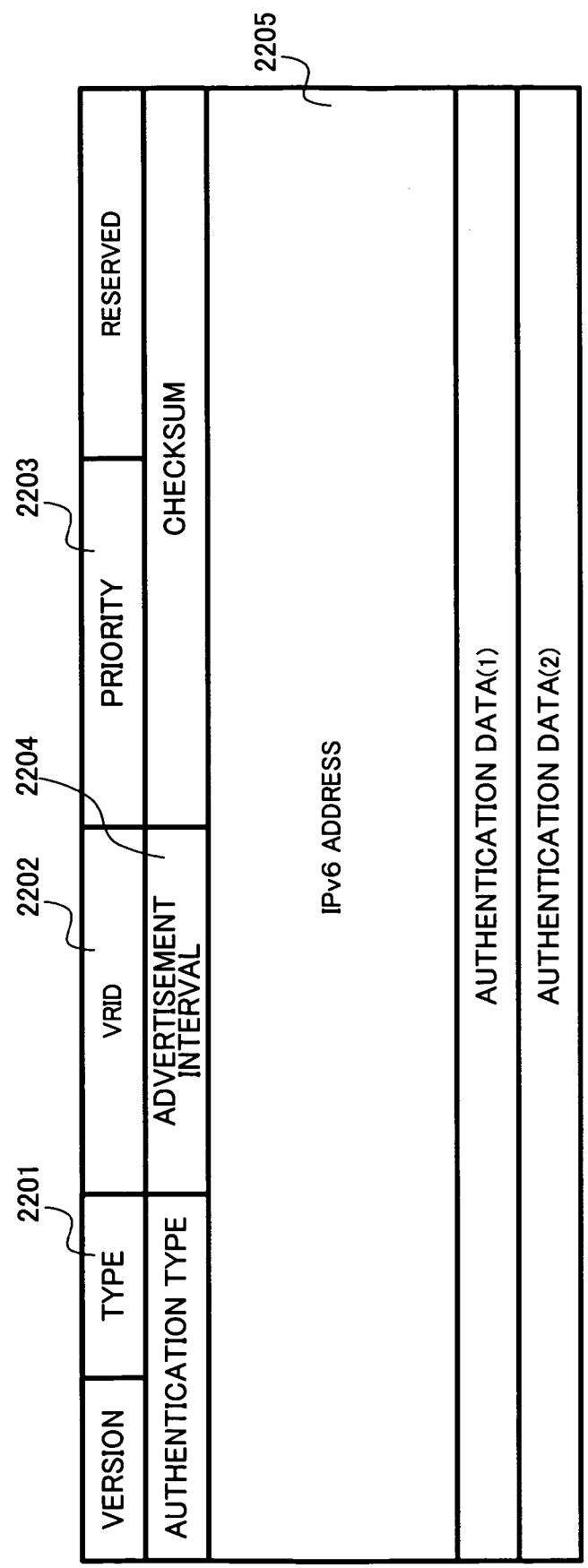
FIG. 26 is a figure showing a format of an advertisement message in the prior art.

Here, the switchover request message is a new setting of a value in the advertisement-message type field 1702 shown in FIG. 26 as a switchover request message identifier. In this embodiment, the value is assumed 3 for example.

The backup router 102 detects a deterioration in the link quality of the master router 100 with an external network by receiving the relevant message, and starts up the process to become a master router in the case the link quality of the relevant apparatus is favorable with an external network.

As in the above, in the switchover process of between master and backup routers, the master router 101, when deteriorating in the link quality with an external network, sends a switchover request message requesting a switchover to the backup router 102. Due to this, because the backup router 102 explicitly receives a switchover instruction, it can switch itself from the backup router 102 to the master router without encountering a time loss. Meanwhile, this allows the network connection apparatus favorable in link state to preferentially become a master router. Furthermore, prior to link disconnection, the backup router next to become a master router can be established.

Embodiment 5

The network connection apparatus in this embodiment is nearly the same in configuration as embodiment 3 except for the difference in that the message processing section 202 in a backup-router state has a function to make a multicast of a shutdown message for shutdown to the master router 101 and a function to interpret a shutdown message.

Figure 19:
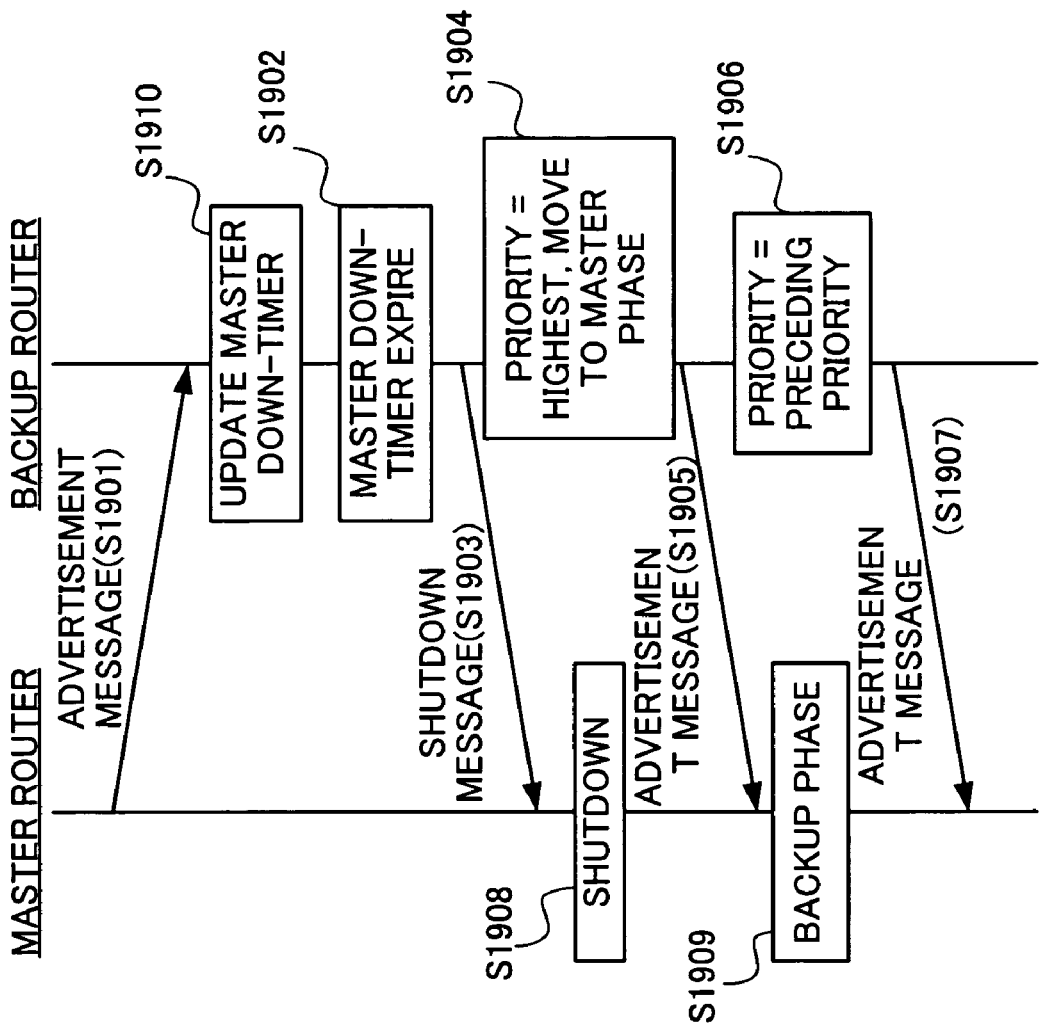
FIG. 19 is a figure showing a sequence of a network connection switching method according to embodiment 5 of the invention.

FIG. 19 shows a sequence to switch the role over between the master and backup routers where there is a backup router higher in priority than the master router 101.

In FIG. 19, the master router 101 is sending advertisement messages at a regular interval to the backup router (step S1901).

The backup router 102, in the case the priority information within the advertisement message is lower than its own priority, sets the master down-timer with a shorter time of a skew time and a master-down-timer remaining time (step S1910). In the case that a shutdown message is not received from another backup-router before the master down-timer goes into time-up (step S1902), a shutdown message is sent by multicast to the master router 101 and other backup routers (step S1903). This shutdown message is new one set, for example, with 4 as an identifier of shutdown message in a type field of the advertisement message shown in FIG. 26. Thereafter, the priority is set at the highest, for transition to an initialization phase (step S1904). The backup router 102, after sending once the advertisement message having the highest priority (step S1905), transits to a master phase thus becoming a new master router. Thereafter, the priority is returned to the former value (step S1906), to send advertisement messages at a regular interval (step S1907).

Meanwhile, the master router 101 received the shutdown message generates a shutdown event and transits to an initialization phase (step S1908). Thereafter, the master router 101, when receiving the advertisement message, transits to a backup phase and becomes a backup router (step S1909).

In the master-backup switchover process, the routers decide their roles by the transition through three states of initialization phase, master phase and backup phase. This procedure is explained by use of FIGS. 20 to 23. As for initialization phase, embodiment 3 is applicable identically.

Figure 20:
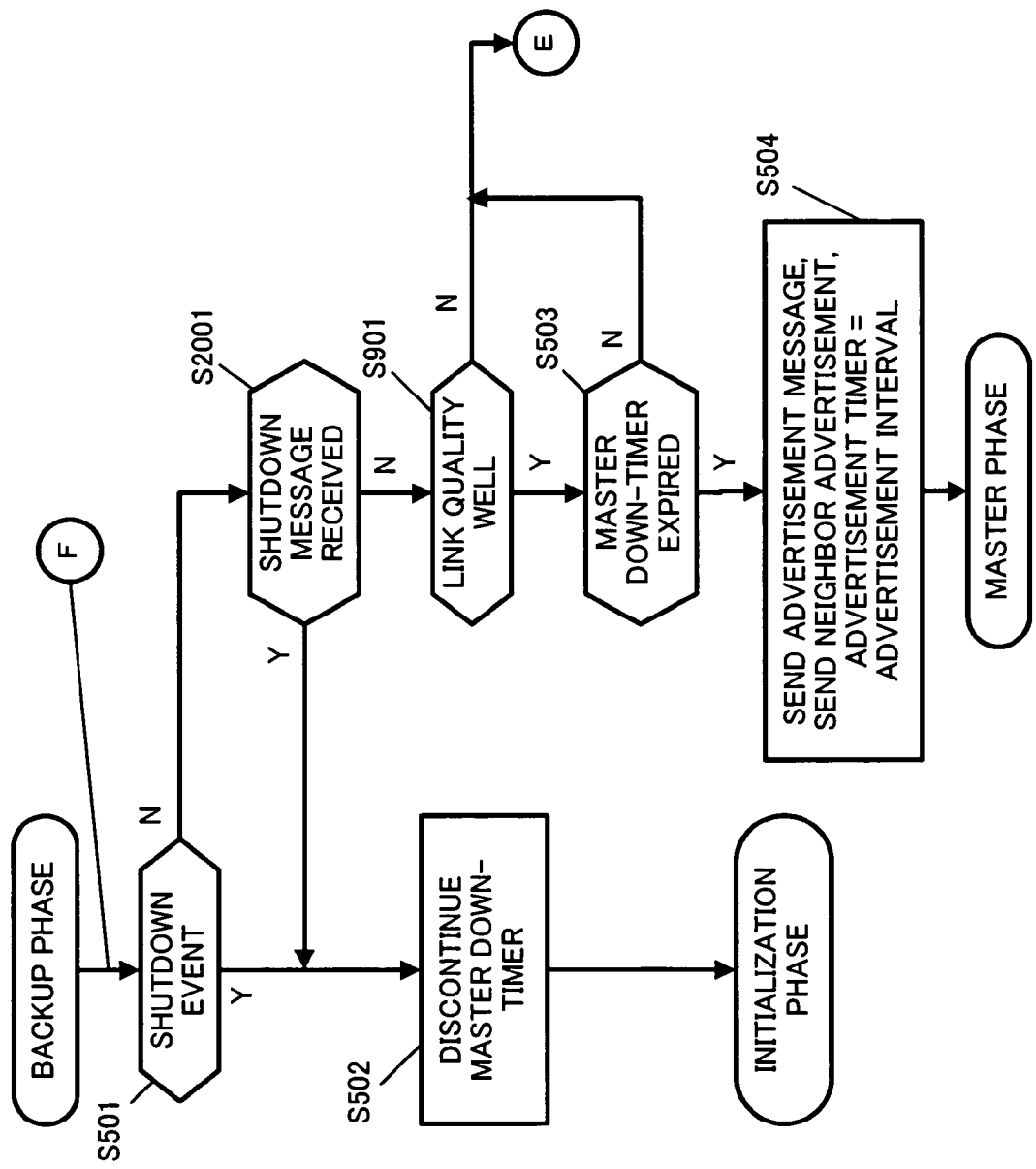
FIG. 20 is a figure showing a part of a procedure in a backup phase of the network connection switching method according to embodiment 5 of the invention.
Figure 21:
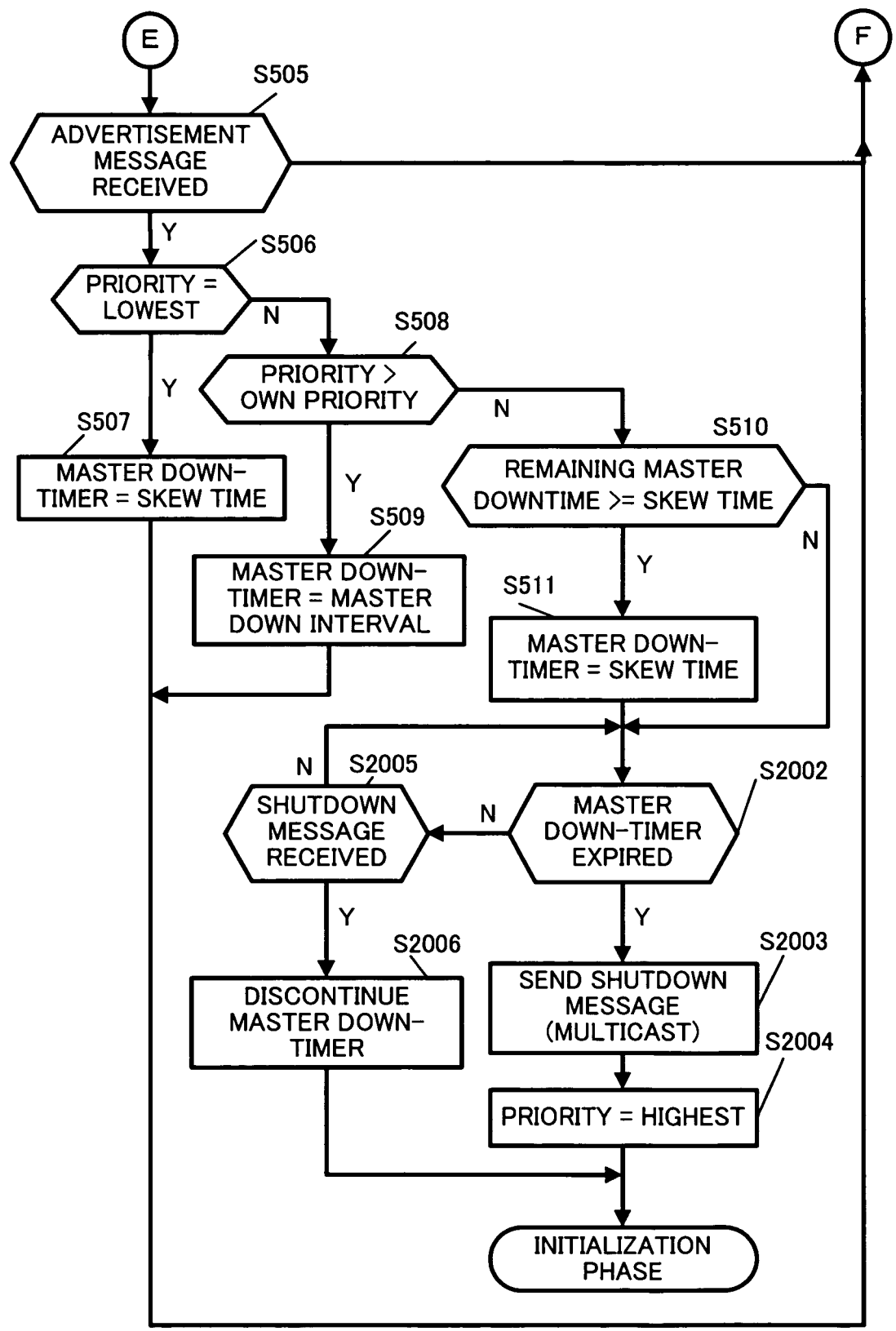
FIG. 21 is a figure showing a part of a procedure in the backup phase of the network connection switching method according to embodiment 5 of the invention.

FIGS. 20 and 21 are charts showing one procedure example in the backup phase. This is different from embodiment 3 in that there are added a procedure to decide a shutdown message reception and a procedure to send a shutdown message. Note that "E" in FIG. 20 is continued to "E" in FIG. 21 while "F" in FIG. 21 is continued to "F" in FIG. 20.

In the case the router receives a shutdown message in the absence of a shutdown event occurrence (step S2001), it discontinues from counting of the master down-timer 205 (step S502) thus making a transition to an initialization phase similarly to the case of a shutdown event occurrence.

Meanwhile, in the case of a backup router 102, the priority of a received advertisement message is equal to or higher than the priority of its own (step S508). In the case the priority of the advertisement message is equal to or higher than the priority of its own, a master down interval is set to the master down time and thereafter the process returns to the step S501. In the case not satisfying this condition, it is decided whether the remaining time of the master down-timer is greater than a skew time or not. When small, the process proceeds to step S2002. When greater, a skew time is set to the master down-timer (step S510).

Then, it is decided whether the master down-timer has gone into time-up or not (step S2002). When not gone into time-up, it is decided whether a shutdown message is received from another backup router. When not received, the process returns to step S2002 while, in case received, the master down-timer is discontinued from counting thus entering an initialization phase.

At step S2002, in the case the master down-timer gone into time-up, a shutdown message is multi-cast to the master router and other backup routers (step S2003). Thereafter, the backup router sets the priority of its own at the highest thus transiting to an initialization phase.

By taking such a procedure, the backup router 102 sent the shutdown message immediately becomes a master router after transition to an initialization phase.

Note that similar operation is obtainable in case the steps S501, S901, S505 and S2001 are replaced in the order similarly to the other embodiment.

Figure 22:
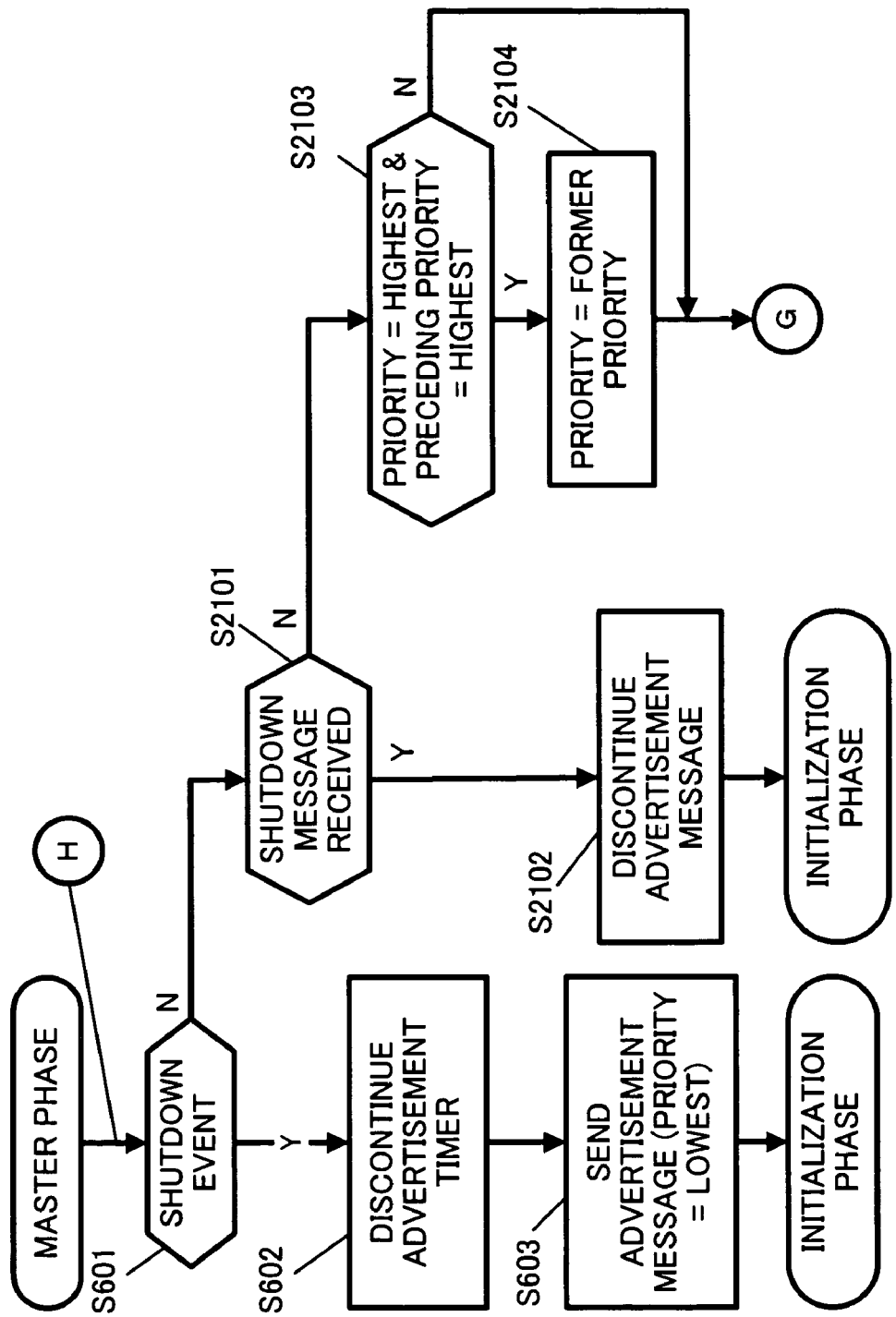
FIG. 22 is a figure showing a part of a procedure in a master phase of the network connection switching method according to embodiment 5 of the invention.
Figure 23:
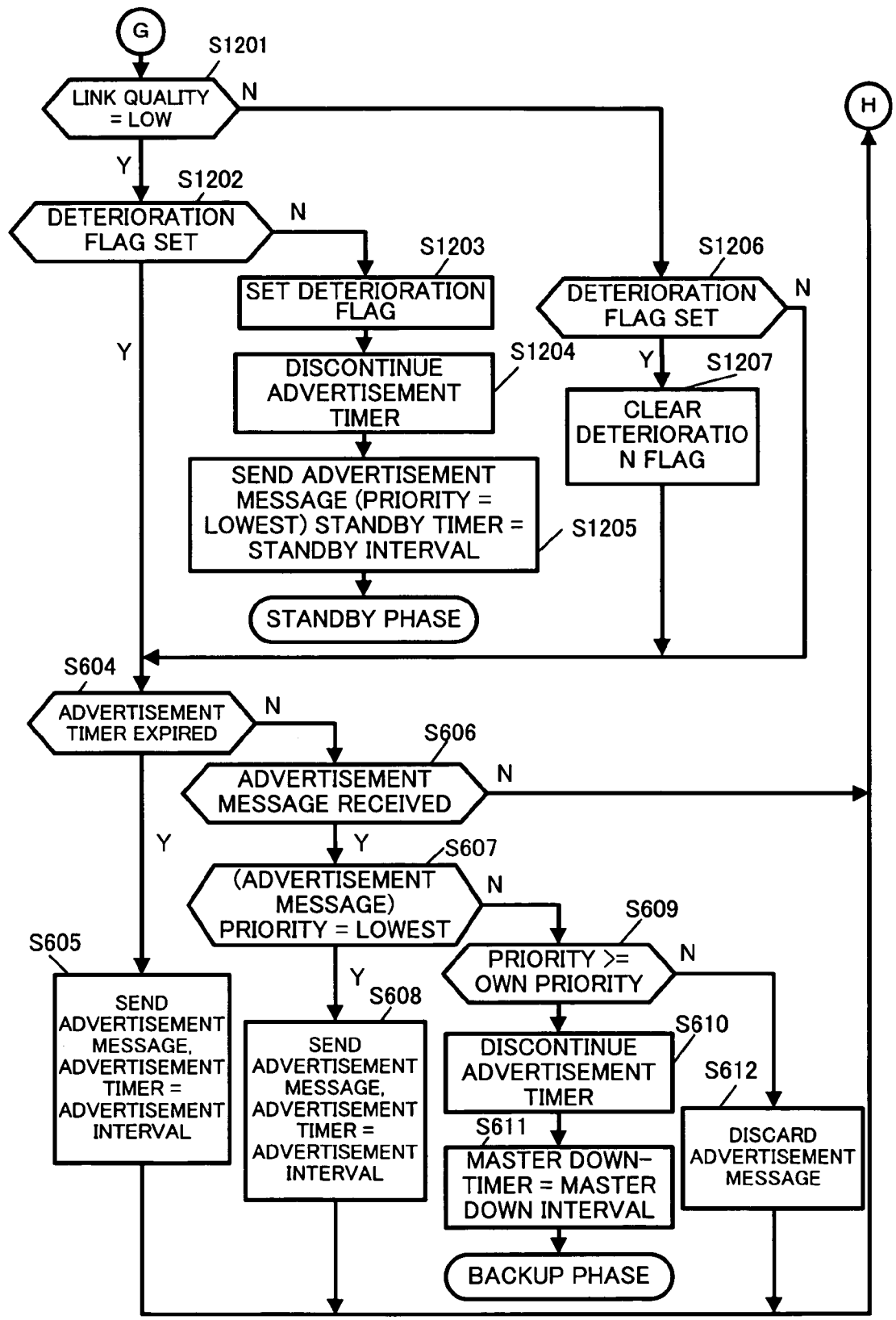
FIG. 23 is a figure showing a part of a procedure in the master phase of the network connection switching method according to embodiment 5 of the invention.
Figure 24:
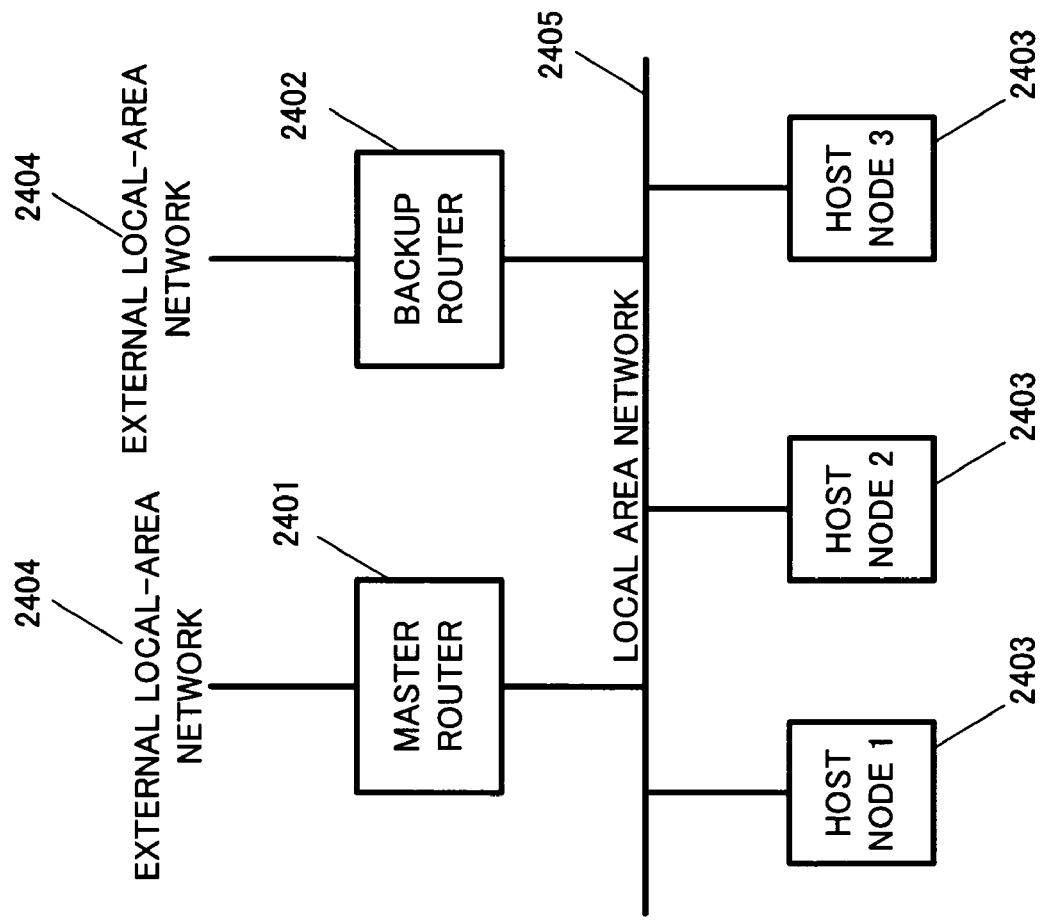
FIG. 24 is a diagram showing a configuration of a network system in a prior art.

FIGS. 22 and 23 are charts showing one procedure example in the master phase. This is different from embodiment 3 in that there are added a procedure to decide a shutdown message reception and a procedure to return the priority rendered the highest during master backup switchover processing to the usual priority. Note that "G" in FIG. 22 is continued to "G" in FIG. 23 while "H" in FIG. 23 is continued to "H" in FIG. 22.

In the case the router receives a shutdown message in the absence of a shutdown event occurrence (step S2101), it discontinues from counting of the advertisement timer 204 (step S2102) thus making a transition to an initialization phase.

Meanwhile, in the case of not detected a shutdown message reception, it is decided whether the current priority is the highest and the preceding priority is not the highest or not (step S2103). In the case of agreement with the foregoing decision condition, the priority is set at the former priority (step S2104).

By taking such a procedure, the network connection apparatus newly become a master in the switchover process of between master and backup routers sends the first advertisement message with the highest priority. However, the second one and the subsequent are to be sent with the usual priority. This allows to continue the master-backup switchover process based on deciding the priority of the relevant apparatus.

Note that similar operation is obtainable in case the steps S601, S2101, S2103, S1201, S604 and s606 are replaced in the order similarly to the other embodiment.

The router detects a startup of switchover process of between master and backup routers by receiving a shutdown message, thus making a transition to an initialization phase.

As in the above, in the present embodiment, the backup router in the master-backup router switchover process can cause the master router to start up the switchover process of between master and backup routers by multi-casting a shutdown message in the case the priority of the master router is lower than the priority of its own.

Incidentally, although the present embodiment was described with embodiment 3 as a basic configuration, this is not limitative. Embodiment 1, 2 or 4 can be taken as a basic configuration. For example, where embodiment 4 is taken as a basic configuration, similar effect is obtainable by multi-casting a shutdown message at a time point that the backup router receives a switchover request message.

INDUSTRIAL APPLICABILITY

The present invention is useful for a network connection apparatus in a virtual router system on a mobile IP network, and suited in effecting a rapid switchover of between master and backup routers.

The invention claimed is:

1. A network connection apparatus for operating a plurality of network connection apparatuses connected to a local area network virtually as one network connection apparatus, the network connection apparatus comprising:
 a state monitor section for managing an operating state as the network connection apparatus;
 a message processing section for performing an exchange process of an advertisement message representative of the operating state during operation as the network connection apparatus;
 a priority comparing section for acquiring priority information representative of a priority to operate as the network connection apparatus from the advertisement message received, and comparing same with priority information possessed; and
 a master transition timer section for counting for a timing of transition of from a standby state into the operating state as the network connection apparatus;
 whereby, when the state monitor section decides that the network connection apparatus is not in the operating state, the priority comparing section commences a process for arbitration between the network connection apparatuses in the standby state to transit to the operating state by use of a master transition timer at a time deciding that the priority possessed is higher than the priority information within the advertisement message received.

2. A network connection apparatus according to claim 1, further comprising a link monitor section for evaluating a connectability with an external network, wherein in a case that the link monitor section decides the connectability as a predefined value or higher when the master transition timer section goes into the time-up, the state monitor section sends the other advertisement message instructing for transition from the operating state into the standby state to the network connection apparatus.

3. A network connection apparatus according to claim 1, further comprising a link monitor section for evaluating a connectability with an external network, wherein in a case that the state monitor section decides operating as the network connection apparatus and the link monitor section decides the connectability lower than a predefined value, the state monitor section instructs the message processing section to send another advertisement message representative of the operating state as the network connection apparatus to the network connection apparatus on a same local area network.

4. A network connection apparatus according to claim 1, further comprising a link monitor section for evaluating a connectability with an external network, wherein in a case the state monitor section decides operating as the network connection apparatus and the link monitor section decides the connectability lower than a predefined value, the state monitor section instructs the message processing section to send another advertisement message requesting for a transition from the standby state into the operating state to the network connection apparatus on a same local area network.

5. A network connection apparatus according to claim 1, wherein a transition request from the operating state into the standby state by the state monitor section is the advertisement message set with the possessed priority at a highest, and the master transition timer section is set with a skew time based on the priority set.

6. A network connection apparatus according to claim 3, wherein the advertisement message representative of the operating state, in a case that the state monitor section decides operating as the network connection apparatus and the link monitor section decides the connectability lower than the predefined value, is set with a priority at a lowest.

7. A network connection apparatus according to claim 2, wherein a transition request from the operating state into the standby state by the state monitor section is the other advertisement message set with the possessed priority at a highest, and the master transition timer section is set with a skew time based on the priority set.

8. A network connection apparatus according to claim 1, further comprising a network device switching section for selecting between: (i) a first mode in which switching of the network connection apparatus to the operational state is based on relative priorities in the advertisement message and that possessed by the network connection apparatus, and (ii) a second mode in which switching of the network connection apparatus to the operational state is based on a shutdown of one of the other network connection apparatuses, currently acting as the network connection apparatus in the operating state.

9. The network connection apparatus according to claim 1, wherein responsive to: (1) the priority associated with the priority information possessed being higher than the priority associated with the acquired priority information; and (2) the state monitor section determining that the network connection apparatus is not in the operating state, the priority comparing section commences the process for arbitration between the network connection apparatuses in the standby state for transition to the operating state such that respective ones of: (i) the network connection apparatus, and (ii) the plurality of other network connection apparatuses that are in the standby state and have the possessed priority higher than the acquired priority, as candidate virtual network connection apparatuses, reduce the transition interval for transition from the standby state into the operating state, and the candidate virtual network connection apparatus having a highest priority has a shortest transition interval prior to sending a subsequent advertisement message.

10. A network connection apparatus for operating a plurality of network connection apparatuses connected to a local area network virtually as one network connection apparatus, the network connection apparatus comprising:

a state monitor section for managing an operating state as the network connection apparatus;

a message processing section for performing an exchange process of an advertisement message representative of the operating state during operation as the network connection apparatus;

an advertisement timer for counting for a timing to send an advertisement message at a regular interval;

a message timer section for counting a time to decide whether the advertisement message is received in a predetermined time from the network connection apparatus operating as the network connection apparatus; and a priority comparing section for acquiring priority information representative of a priority to operate as the network connection apparatus from the advertisement message received, and comparing same with priority information possessed; and a master transition timer section for counting a timing of transition from a standby state into the operating state as the network connection apparatus;

whereby, when the state monitor section decides that the network connection apparatus is not in the operating state, the priority comparing sections, in a case of the decision that the priority possessed is higher than the priority information in the received advertisement messages, compares between a remaining time of the message timer section and a skew time calculated based on the priority possessed, to set the skew time to the master transition timer section when the skew time is shorter, so that, when the master transition timer section goes into a time-up, the state monitor section instructs the message processing section to send another advertisement message requesting for transition from the operating state into the standby state to the network connection apparatus.

11. A network connection apparatus according to claim 10, further comprising a link monitor section for evaluating a connectability with an external network, wherein in a case that the link monitor section decides the connectability as a predefined value or higher when the master transition timer section goes into a time-up, the state monitor section sends another advertisement message instructing for transition from the operating state into the standby state to the network connection apparatus operating as the network connection apparatus.

12. A network connection apparatus according to claim 10, further comprising a link monitor section for evaluating a connectability with an external network, wherein in a case that the state monitor section decides operating as the network connection apparatus and the link monitor section decides the connectability lower than a predefined value, the state monitor section instructs the message processing section to send another advertisement message representative of the operating state as the network connection apparatus to the network connection apparatus on a same local area network.

13. A network connection apparatus according to claim 10, further comprising a link monitor section for evaluating a connectability with an external network, wherein in a case that the state monitor section decides operating as a network connection apparatus and the link monitor section decides the connectability lower than a predefined value, the state monitor section instructs the message processing section to send another advertisement message requesting for a transition from the standby state into the operating state to the network connection apparatus on a same local area network.

14. A network connection apparatus according to claim 10, wherein a transition request from the operating state into the standby state by the state monitor section is the advertisement message set with the possessed priority at a highest, and the master transition timer section is set with a skew time based on the priority set.

15. A network connection apparatus according to claim 11, wherein a transition request from the operating state into the standby state by the state monitor section is the other advertisement message set with a possessed priority at a highest, and the master transition timer section is set with a skew time based on the priority set.

16. A network connection apparatus according to claim 12, wherein the other advertisement message representative of the operating state, in a case that the state monitor section decides operating as the network connection apparatus and the link monitor section decides the connectability lower than a predefined value, is set with a priority at a lowest.

17. A network connection switching method comprising:

a state monitoring step of deciding whether a plurality of network connection apparatuses connected to a local area network are in an operating state or in a standby state as a network connection apparatus to operate virtually as one network connection apparatus;

a step of receiving an advertisement message from a second network connection apparatus in the operating state as a network connection apparatus by a first network connection apparatus decided as the standby state in the decision; and a priority comparing step of comparing between priority information, in the advertisement message, representative of a priority to operate as the network connection apparatus and priority information possessed;

whereby an arbitration process is commenced between the network connection apparatuses in the standby state to transit to the operating state at a time that the priority possessed is decided higher in the priority comparing step.

18. A network connection switching method comprising:

a state monitoring step of deciding whether a plurality of network connection apparatuses connected to a local area network are in an operating state or in a standby state as a network connection apparatus to operate virtually as one network connection apparatus;

a step of receiving an advertisement message from a second operating network connection apparatus in an operating step as a network connection apparatus by a first network connection apparatus decided as the standby state in the decision;

a step of counting a master down time for a decision as to whether the advertisement message is to be received in a predetermined time from the second network apparatus;

a step of notifying of a transition to the operating state from the first network apparatus to the second network apparatus when the master down time expires;

a priority comparing step of comparing between priority information, in the advertisement message, representative of a priority to operate as the network connection apparatus and priority information possessed; and a step of comparing between a remaining time of the master down time and a skew time calculated shorter in time as the priority possessed is higher when the priority possessed is higher in the priority comparing step, and replacing the master down time with the skew time when the skew time is shorter.

19. A network connection switching method according to claim 18, further comprising a step of detecting whether a connectability with an external network is equal to or greater than a predefined value or not, and a step of permitting the notification, of a transition to the operating state, from the first network apparatus to the second network apparatus only when the connectability is equal to or greater than the predefined value in the detection at the first network connection apparatus.

20. A network connection switching method according to claim 19, further comprising a transition request step for the second network connection apparatus to request the first network connection apparatus to transit to the operating state when the connectability of the second network connection apparatus is not equal to or greater than the predefined value.

21. A network connection switching method according to claim 18, further comprising a step of temporarily setting the priority possessed at a highest when the priority possessed is higher in the priority comparing step at the first network connection apparatus, to notify the priority information possessed from the first network connection apparatus to the second network connection apparatus and other standby network connection apparatus in the step of notifying of the transition to the operating state.

22. A network connection switching method according to claim 20, wherein, in the transition request step, the second network connection apparatus makes a notification with the priority possessed rendered a lowest.

23. A network connection switching method according to claim 21, wherein the priority possessed is returned to a value immediately preceding to a setting at a highest after a transition of the first network connection apparatus from standby state into the operating state.

24. A network connection switching method according to claim 20, further comprising a step of replacing the master down time with the skew time at a time that the first network connection apparatus receives the transition request from the second network connection apparatus.

25. A network connection switching method according to claim 19, further comprising a step of temporarily setting the priority possessed at a highest when the priority possessed is higher in the priority comparing step at the first network connection apparatus, to notify the priority information possessed from the first network connection apparatus to the second network connection apparatus and other standby network connection apparatus in the step of notifying the transition to the operating state.

26. A network connection switching method according to claim 25, wherein the priority possessed is returned to a value immediately preceding to a setting at a highest after a transition of the first network connection apparatus from the standby state into the operating state.

* * * * *

UNITED STATES PATENT AND TRADEMARK OFFICE
CERTIFICATE OF CORRECTION

PATENT NO. : 7,433,317 B2  
APPLICATION NO. : 10/526210  
DATED : October 7, 2008  
INVENTOR(S) : Hirokazu Kobayashi et al.

Page 1 of 1

It is certified that error appears in the above-identified patent and that said Letters Patent is hereby corrected as shown below:

In claim 10 of the Letters Patent at Column 21, line 35, "comparing sections," should read -- comparing section, --

In claim 10 of the Letters Patent at Column 21, lines 37-38, "advertisement messages," should read -- advertisement message, --

Signed and Sealed this

Twenty-fourth Day of February, 2009

JOHN DOLL  
*Acting Director of the United States Patent and Trademark Office*